(12) United States Patent
Sudjianto et al.

(10) Patent No.: US 8,326,723 B2
(45) Date of Patent: Dec. 4, 2012

(54) RISK AND REWARD ASSESSMENT MECHANISM

(75) Inventors: Agus Sudjianto, Matthews, NC (US);
Michael Chorba, Charlotte, NC (US);
Daniel Hudson, Charlotte, NC (US);
Sandi Setiawan, Charlotte, NC (US);
Jocelyn Sikora, Charlotte, NC (US);
Harsh Singhal, Charlotte, NC (US);
Kiran Vuppu, Charlotte, NC (US);
Kaloyan Mihaylov, New York, NY (US); Jie Chen, Charlotte, NC (US);
Timothy J. Breault, Huntersville, NC (US); Arun R. Pinto, Charlotte, NC (US); Naveen G. Yeri, Charlotte, NC (US); Benhong Zhang, Charlotte, NC (US); Zhe Zhang, Charlotte, NC (US);
Tony Nobili, Charlotte, NC (US);
Hungien Wang, Charlotte, NC (US);
Aijun Zhang, Ann Arbor, MI (US)

(73) Assignee: Bank of America Corporation, Charlotte, NC (US)

( * ) Notice: Subject to any disclaimer, the term of this patent is extended or adjusted under 35 U.S.C. 154(b) by 336 days.

(21) Appl. No.: 12/546,807

(22) Filed: Aug. 25, 2009

(65) Prior Publication Data

US 2010/0293107 A1 Nov. 18, 2010

Related U.S. Application Data

(63) Continuation-in-part of application No. 11/848,227, filed on Aug. 30, 2007, now Pat. No. 7,765,139.

(51) Int. Cl.
*G06Q 40/00* (2012.01)
(52) U.S. Cl. .......................... 705/36 R; 705/35; 705/38
(58) Field of Classification Search ............... 705/35–45
See application file for complete search history.

(56) References Cited

U.S. PATENT DOCUMENTS

| 2005/0216384 A1 | 9/2005 | Partlow et al. |
| 2006/0218068 A1 | 9/2006 | Loeper |
| 2007/0055595 A1 | 3/2007 | Keyes et al. |

*Primary Examiner* — Charles Kyle
*Assistant Examiner* — Seth Weis
(74) *Attorney, Agent, or Firm* — Banner & Witcoff, Ltd.; Michael A. Springs

(57) ABSTRACT

A data driven and forward looking risk and reward appetite methodology for consumer and small business is described. The methodology includes customer segmentation to create pools of homogeneous assets in terms of revenue and loss characteristics, forward looking simulation to forecast expected values and volatilities of revenue and loss, and risk and reward optimization of the portfolio. One methodology used for modeling revenue and loss is a generalized additive effect decomposition model to fit historical data. Based on the model, a segmentation procedure is performed, which allows for creation of groups of customers with similar revenue and loss characteristics. An estimation procedure for the model is developed and a simulation strategy to forecast and simulate revenue and loss volatility is developed. Efficient frontier curves of risk (e.g., return volatility) and reward (e.g., expected return) are created for the current portfolio under various economic scenarios.

12 Claims, 28 Drawing Sheets

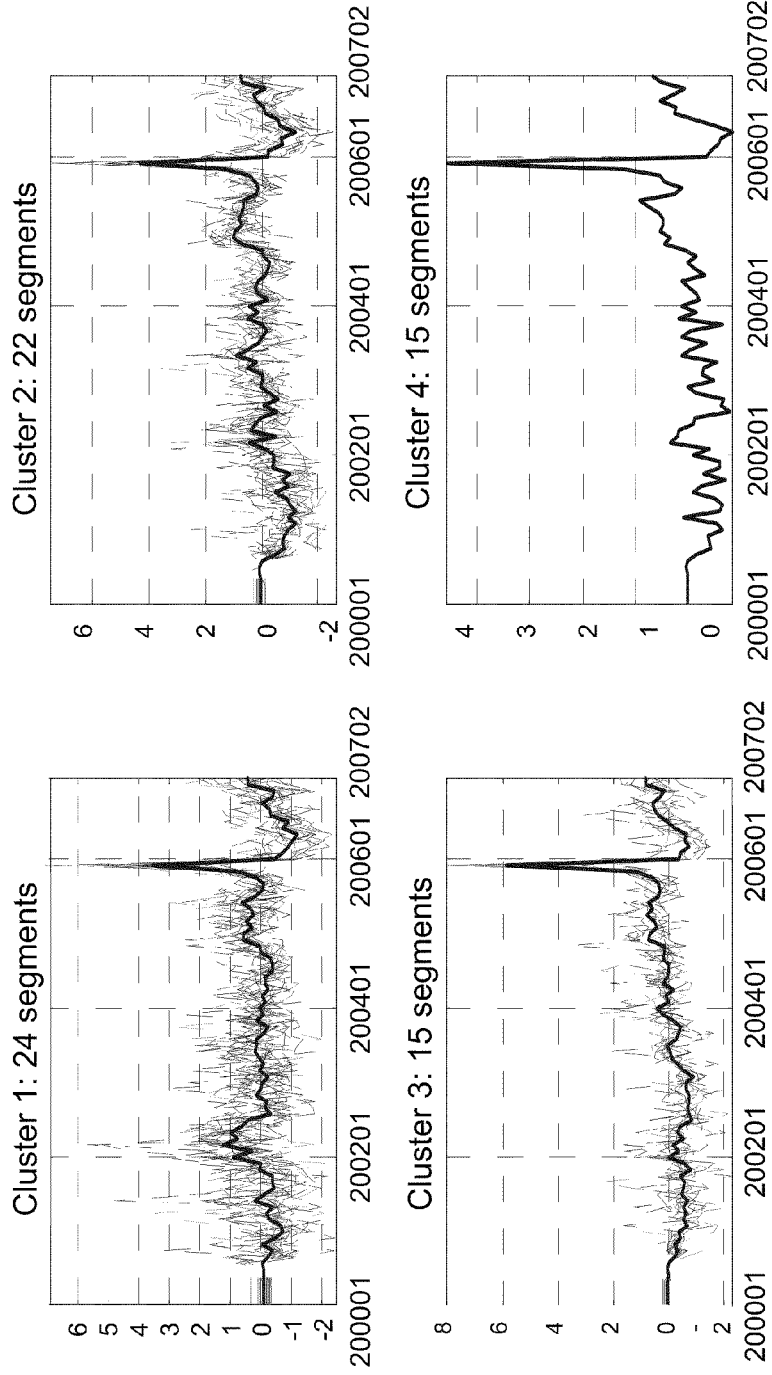
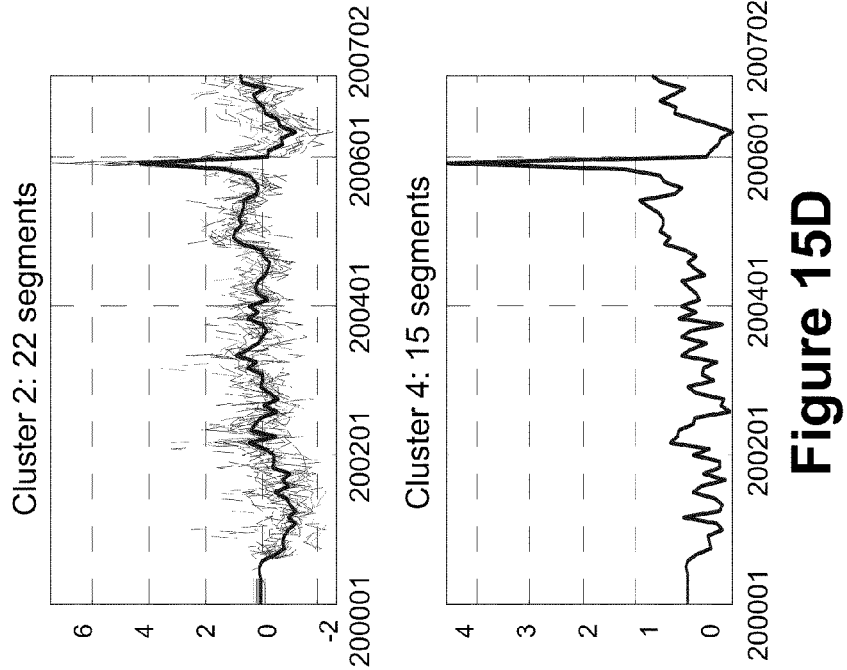
Figure 15A — Cluster 1: 24 segments
Figure 15B — Cluster 2: 22 segments
Figure 15C — Cluster 3: 15 segments
Figure 15D — Cluster 4: 15 segments

RRAM SEGMENT #1

| Business detail segment or accounts | last 1 year average | | "factor adjustment" | Forecast | Forecast notes |
|---|---|---|---|---|---|
| | Balance | Profit | | | |
| business detail segment a | 500 | 10.00% | 162% | 11.63% | 162% x 7.18% = 11.63% |
| business detail segment b | 400 | 6.18% | 100% | | |
| business detail segment c | 300 | 3.00% | 49% | | |
| business detail segment d | 200 | 2.00% | 32% | | |
| business detail segment e | 100 | 5.00% | 81% | | |
| Total RRAM seg #1 | 1,500 | 6.18% | n.a. | 7.18% | |

Assets initially desired RRAM seg. #1 as % of other segments: 5%.

Assets new desired RRAM seg. #1 as % of other segments: 7%.

Default (historical) distribution

Asset a: 1%
Asset b: 1%
Asset c: 1%
Asset d: 1%
Asset e: 1%

Default (historical) distribution.

Asset a: 5%
Asset b: 1%
Asset c: 0%
Asset d: 0%
Asset e: 1%

Figure 26

RISK AND REWARD ASSESSMENT MECHANISM

The present application is a continuation-in-part of and claims the benefit of priority from U.S. application Ser. No. 11/848,227, filed Aug. 30, 2007, and entitled "RISK AND REWARD ASSEMENT MECHANISM," the content of which is incorporated herein by reference in its entirety.

BACKGROUND

A business seeks to improve on the assets of its portfolio. Risk and reward associated with one or more portfolios changes over time depending on a number of different economic conditions. Businesses assets the returns of particular assets versus the volatility in order to try to better manage their portfolio and reach a desired state. A balance is needed between business growth opportunities and a business's portfolio in order to take into account various macroeconomic scenarios and their impact on the business's portfolio.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Understanding the dynamics of credit risk with respect to time is useful. Aspects of the present disclosure provide a method that identifies the historical performance and current state of any given portfolio of an entity. Aspects of the present disclosure aid a managing entity to pro-actively steer an entity by making informed policy decisions, inherently making a positive impact on shareholder value, considering internal policy and external macro-economic effects on any given portfolio.

Aspects of the present disclosure are directed to an end-to-end process of applying statistical methods to produce unique analysis to a portfolio. The method may include collecting and organizing segmented data and decomposing performance data into seasoning, vintage, and cycle effects. The method may further form statistical clusters for the basis of predicting performance. Cycle and macroeconomic forecasts may be applied to the clustered segments, and a product or portfolio of an entity may be optimized using the prediction data.

Still other aspects of the present disclosure are directed to a strategic portfolio and segment level tool derived from account level data that may identify the historical and predicted efficient frontier of a portfolio. The tool may include attrition, misconduct, revenue, loss, balance, and recovery information. The tool may include historical, forecast, optimization, and auto-validation capabilities. The tool also may be configured to run multiple simulation and optimization scenarios, such as the effect of a bull market, a bear market, a base market, through a particular cycle, and even customized, such as the 1991 recession. Aspects of the present disclosure allow for analysis of a plurality of metrics, including volatility. Still further aspects allow a user to drill down in the outputted data to obtain useful graphical results and spreadsheet data. In accordance with yet another aspect, the method decomposes and isolates the maturation effects from vintage effects from macroeconomic/cycle/other effects at a segment, vintage, and total portfolio level.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein:

FIGS. 15A-15D are illustrative charts for characterizing segment clusters of cycle volatility in accordance with at least one aspect of the present disclosure;

FIG. 26 is another diagram of utilization of the illustrative risk reward assessment process in FIG. 24;

DETAILED DESCRIPTION

In the following description of the various embodiments, reference is made to the accompanying drawings, which form a part hereof, and in which is shown by way of illustration of various embodiments in which the disclosure may be practiced. It is to be understood that other embodiments may be utilized and structural and functional modifications may be made.

Figure 1:
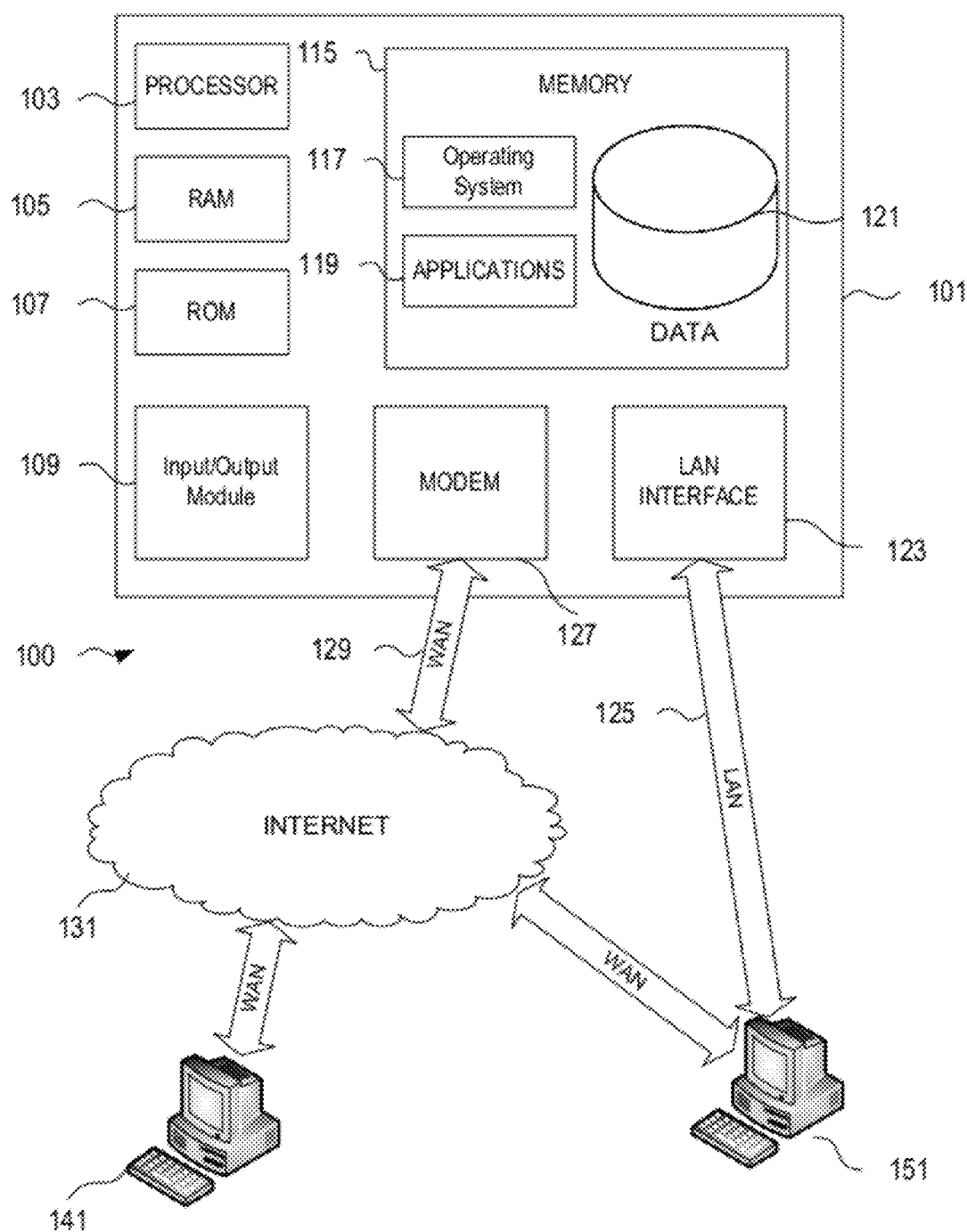
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

I/O 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of account information and account holder information for the entire business, allowing interoperability between different elements of the business residing at different physical locations.

The server 110 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
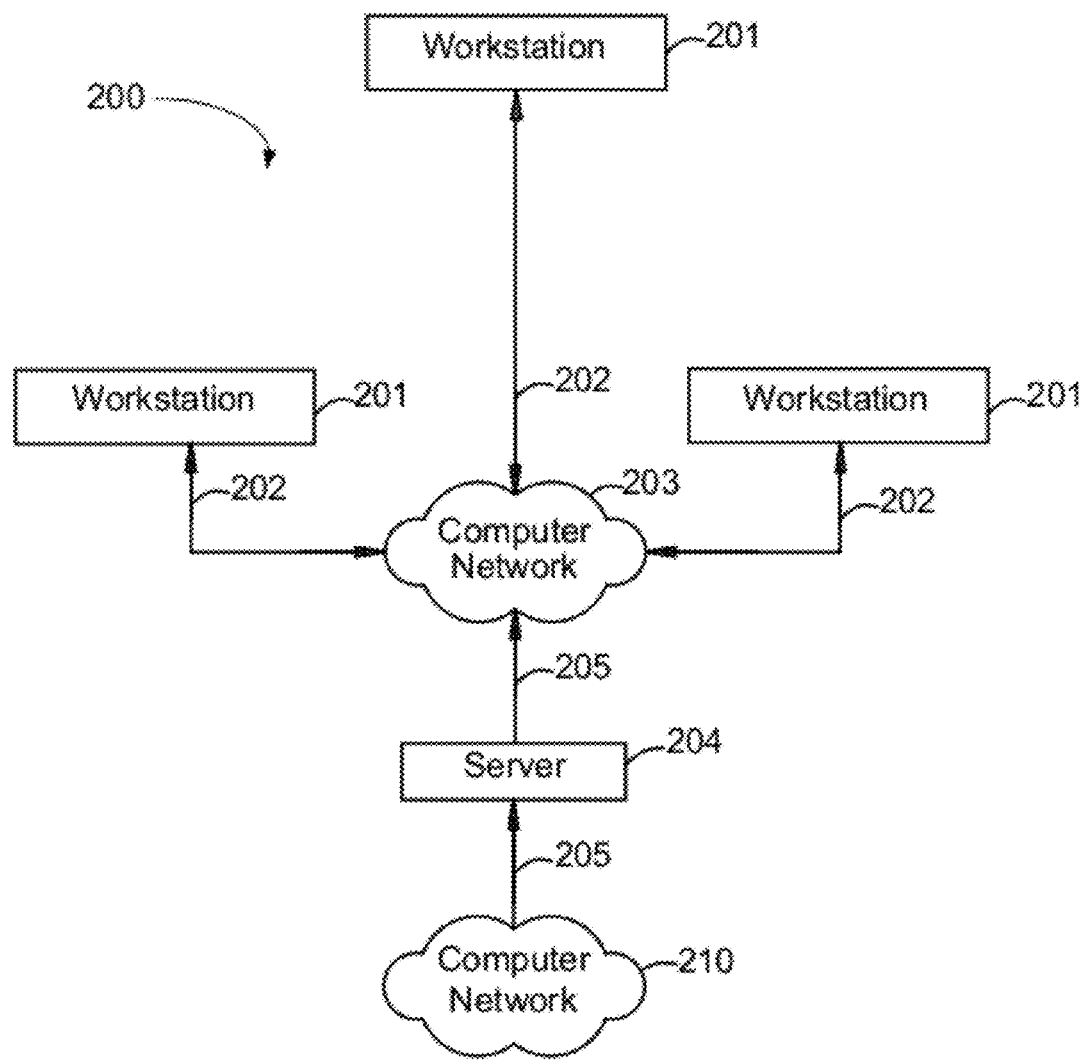
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

An efficient frontier curve is commonly known in the art to depict trade-offs between potential risk and reward. Whenever possible, it is preferable to direct strategy and action (e.g., new account origination, account management such as pricing and line of credit assignment, and securitization for the purpose of risk transfer) to move the portfolio performance at the frontier line where maximum reward (e.g., expected return) with minimum risk performance lie. The frontier line can guide decision makers to set risk appetite (e.g., set reasonable expected value of return and its associated volatility implication). The curve can also be used to evaluate the performance of on-going actions whether they are moving managed portfolio closer to its "ideal" benchmark performance. To apply the risk/reward appetite concept to consumer products, the following steps may be implemented:

1. Perform customer segmentation to divide the portfolio into "investment units" with distinct return (revenue and loss) characteristics among segments and similar characteristics within segment;
2. Create performance models to predict revenue and loss including the impact of economic cycles to the performance;
3. Characterize correlations among segments;
4. Simulate return of each segments including their variation; and
5. Optimize portfolio by
   a. Adjusting the "investment size" of each segments to setup direction for new account origination and risk distribution through securitization, and
   b. Adjusting possible pricing alternatives as suggested by "reduced gradient" and "shadow price" information from optimization.

To perform customer segmentation, factors driving distinct performance characteristics such as the following are included: credit risk factors (e.g., FICO, LTV), product types, acquisition channels, geography, and customer relationships (customer with multiple product relationships). Considering "vintage" information (e.g., "age" or "length" of relationship is a characteristic of credit performance, the data uses include two trajectories: month on book (m) to characterize the vintage effects and calendar time (t) to characterize the exogenous effects. A portfolio may be divided into 23 FICO bands of 10 point increment, 10 geographical regions, 2 types of customer relationship (Yes/No), 15 types of products/sub-products, and 4 possible channels. Thus, there are at least $23 \times 10 \times 2 \times 15 \times 4 = 27,600$ possible segments. In practice, it is impractical and not necessary to have such large number of segments. To reduce the number of segments into a manageable size, statistical segmentation is performed to merge segments with similar performance together, as described in below.

Once segmentation is completed, a model is developed by fitting historical data. The model implies that performance characteristics are decomposed into two additive components: maturation curve to characterize vintage (e.g., months on book) effect under "economic-neutral" condition and exogenous curve to characterize the effect of exogenous factors (e.g., economic cycle, management policy changes). The decomposition clearly evaluates the maturation and exogenous effects. The exogenous curve facilitates "scenario" forecasting to evaluate segment performance under different economic scenarios. Modeling the maturation curve is purposed by using a "quasi-parametric" approach of superposition of multiple logistic functions and decompose further the exogenous effect into irregular patterns due to special economic events, short term seasonal effects, and long term overall trend. The long term overall trend is linked to macroeconomic factor using factor models described below.

Forecast and simulation of each vintage performance predict future performance. Model validation and simulation approach is described below. Based on the simulation output, portfolio optimization and efficient frontier curves are created under different macroeconomic scenarios. The optimization approach is described below.

In the following, the data structure used in the analysis is described in addition to the general model proposal. The use of individual account level information monthly performance summarized aggregated at segment level is proposed. Therefore, the first step of data preparation is to summarize monthly performance variables at segment level characterized by vintage (e.g., month and year of origination) and monthly calendar time.

Figure 4:
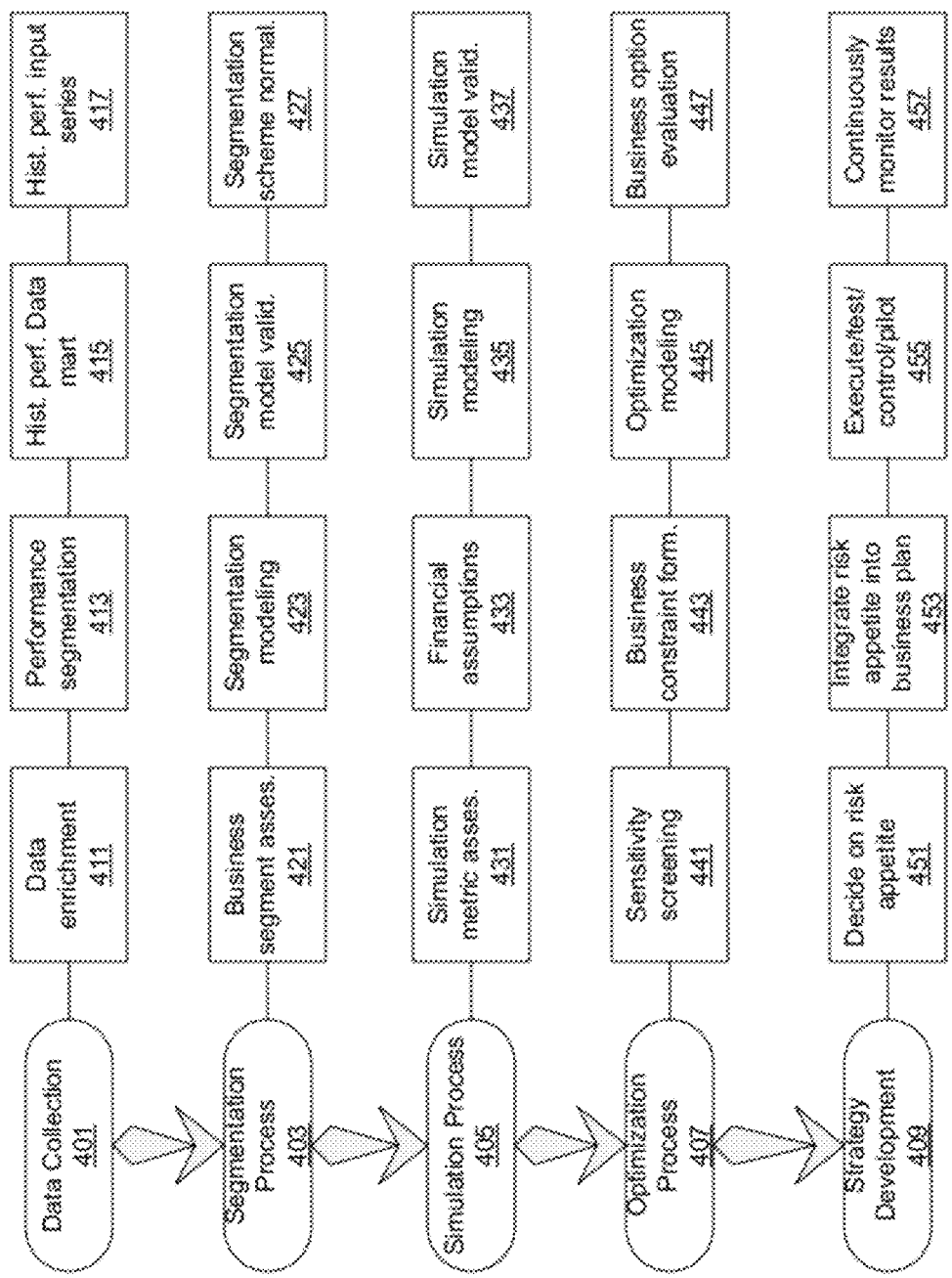
FIG. 4 is a block diagram of an illustrative risk reward appetite process in accordance with at least one aspect of the present disclosure.

FIG. 4 is a block diagram of an illustrative risk reward appetite process/system in accordance with at least one aspect of the present disclosure. FIG. 4 represents a general overall of various aspects of the entire process/system. Components 411-417 may constitute the components that operate with respect to the data collection process step 401 of the present disclosure. Within component 411, input data may be enriched/processed. Performance segmentation on data occurs within component 413. Historical performance data mart component 415 maintains historical customer account data. Historical performance input series component 417 performs decomposition on segmented historical customer account level data.

Components 421-427 may constitute the components that operate with respect to the segmentation process step 403 of the present disclosure. A business segment assessment component 421 is included. Segmentation model processing occurs with respect to component 423. Segmentation modeling validation may occur with respect to component 425. Component 427 may perform segmentation scheme normalization. Components 431-437 may constitute the components that operate with respect to the simulation process step 405 of the present disclosure. A simulation metric assessment component 431 is included. Financial assumptions may be accounted for by component 433. Simulation modeling processing occurs with respect to component 435. Simulation modeling validation may occur with respect to component 437.

Components 441-447 may constitute the components that operate with respect to the optimization process step 407 of the present disclosure. A sensitivity screening component 441 is included. Business constraint formulation processing occurs with respect to component 443. Optimization modeling may occur with respect to component 445. Component 447 may perform business option evaluation. Components 451-457 may constitute the components that operate with respect to the strategy development process step 409 of the present disclosure. Decisions on a risk appetite for a portfolio may occur with respect to component 451. The risk appetite may be integrated into one or more business plans by component 453. Execution, control, testing, and piloting of the strategy processing occurs with respect to component 455. Pilot results may be continuously monitored with respect to component 457.

Figure 3:
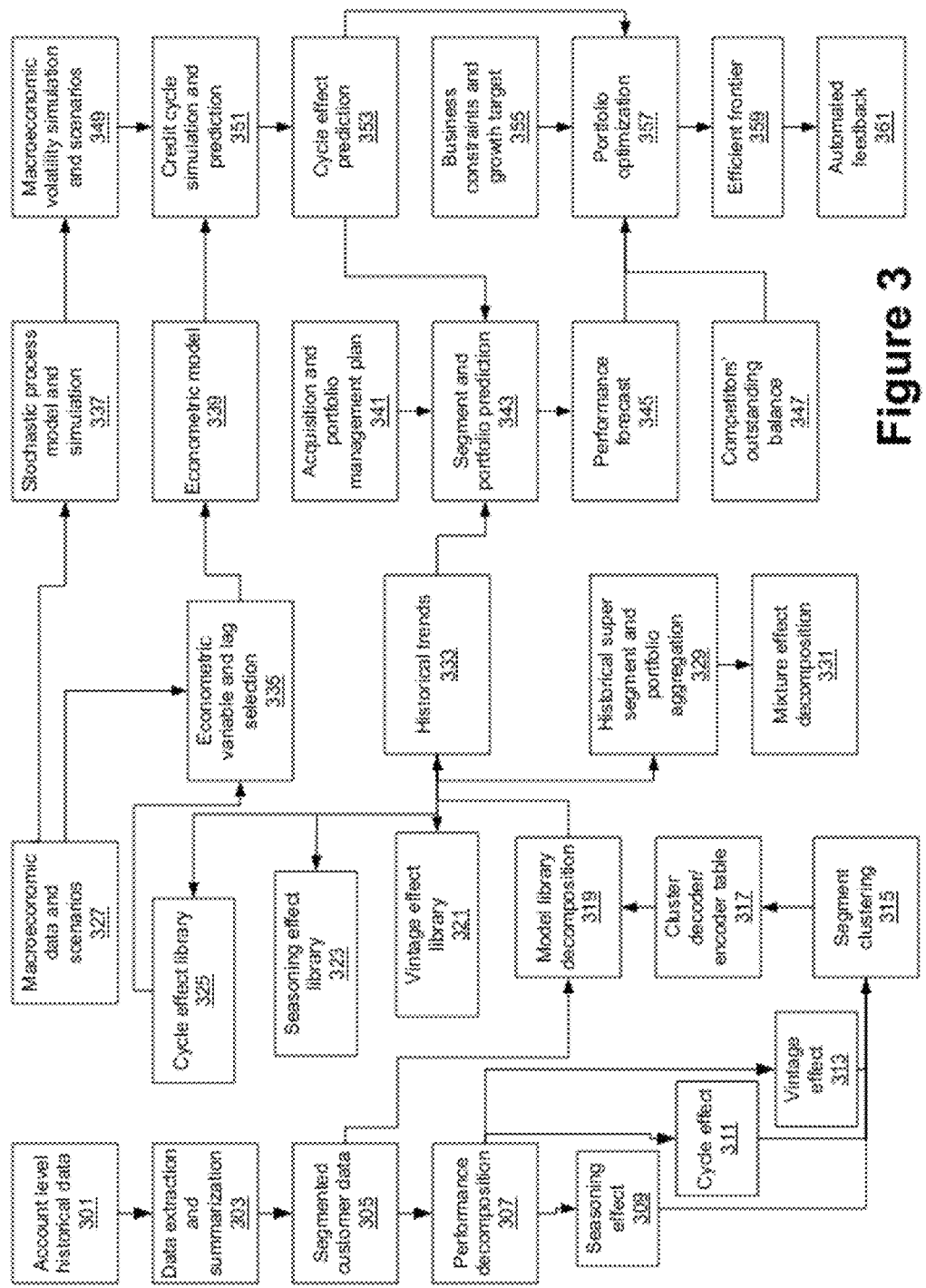
FIG. 3 is a flow chart of an illustrative method for forecasting expected values and volatilities of revenue and loss and optimizing a business's portfolio in accordance with at least one aspect of the present disclosure.

FIG. 3 is a flow chart of an illustrative method for forecasting expected values and volatilities of revenue and loss and optimizing a business's portfolio in accordance with at least one aspect of the present disclosure. Steps 301-313 may constitute data gathering steps of a risk and reward appetite model. In step 301, customer account level historical data is inputted into the system. Any of a multitude of historical data with respect to revenue and loss for various aspects of various customers' portfolio may be included. Proceeding to step 303, a data extraction and summarization process and model are implemented on the customer account level historical data. In this step, the historical data with respect to various revenues and losses is processed with respect to any of a number of various scenarios for data utilization.

Proceeding to step 305, segmented customer data may be stored for processing by other steps of the present disclosure. The segmented customer data from step 305 then is utilized as an input to step 307 where performance decomposition is performed on the data. In step 307, the segmented customer data is decomposed into various effects for output. Specifically, the segmented customer data is decomposed into seasoning effect output data 309, cycle effect output data 311, and vintage effect output data 313. The seasoning effect data 309, cycle effect data 311, and vintage effect data 313 may be derived from a number of different processes including a performance measure that utilizes a deterministic functional effect of seasoning as a function of months on the book, a mean-reverting stochastic process as a function of calendar time conditional on multivariate macroeconomic stochastic variables, such as unemployment and interest rate, a stochastic process of vintage effect as a function of origination condition, such as an underwriting policy and strategy at a particular time, in addition to other independent variables.

Figure 6:
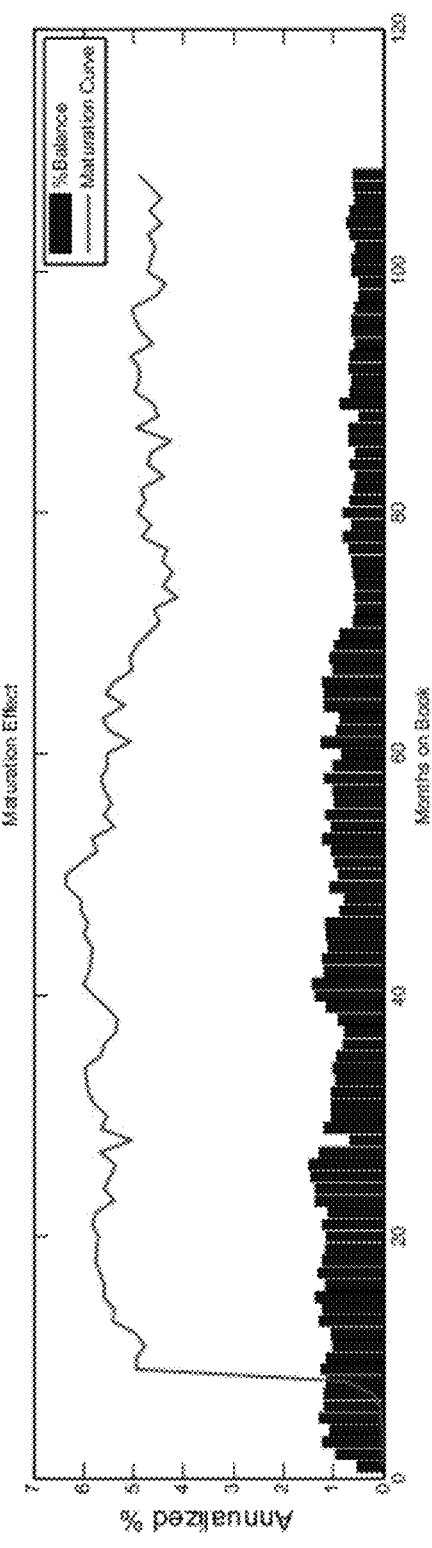
FIG. 6 is an illustrative diagram of an example maturation effect decomposition of net credit loss in accordance with at least one aspect of the present disclosure.
Figure 10:
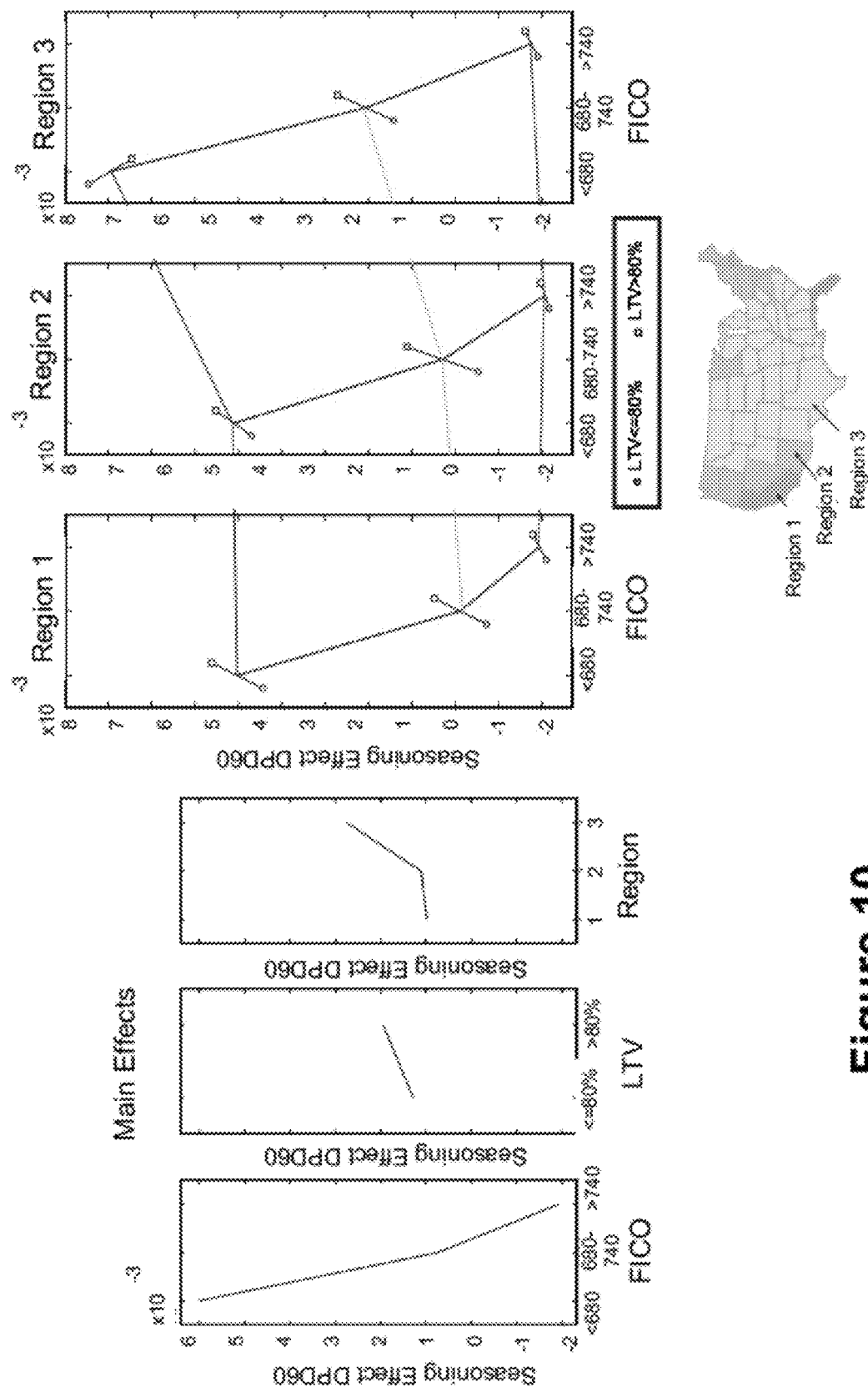
FIG. 10 is an illustrative seasoning effect factor analysis chart in accordance with at least one aspect of the present disclosure.

FIG. 6 is an illustrative diagram of an example maturation/seasoning effect decomposition of net credit loss in accordance with at least one aspect of the present disclosure. FIG. 10 is an illustrative seasoning effect factor analysis chart in accordance with at least one aspect of the present disclosure. Such outputs may be generated as part of the seasoning effect data 309.

Figure 7:
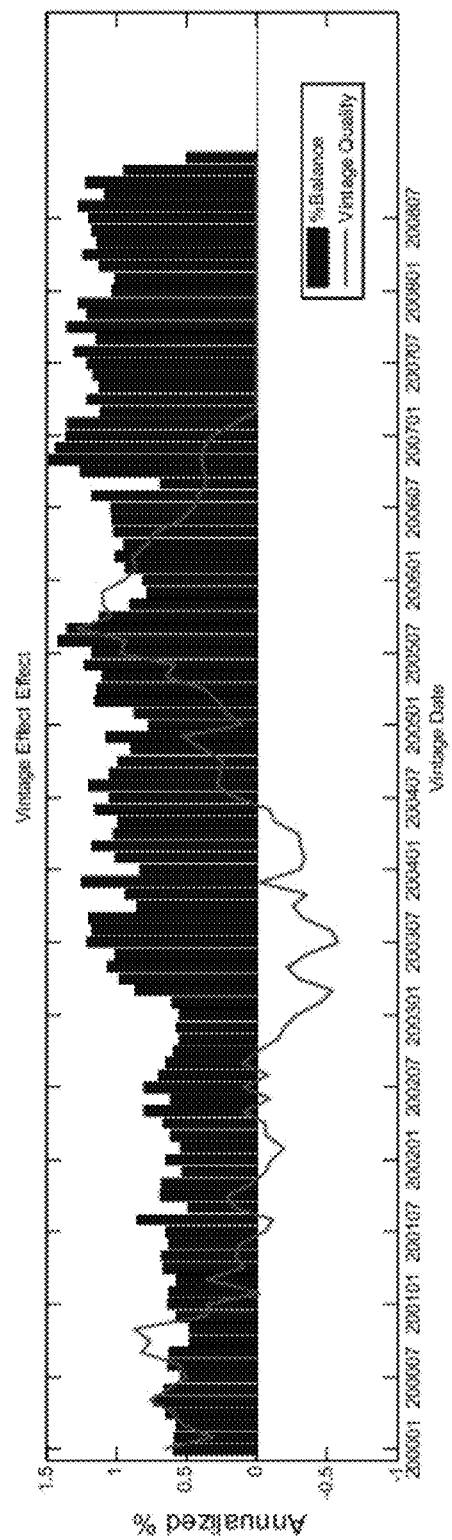
FIG. 7 is an illustrative diagram of an example vintage effect decomposition of net credit loss in accordance with at least one aspect of the present disclosure.
Figure 11:
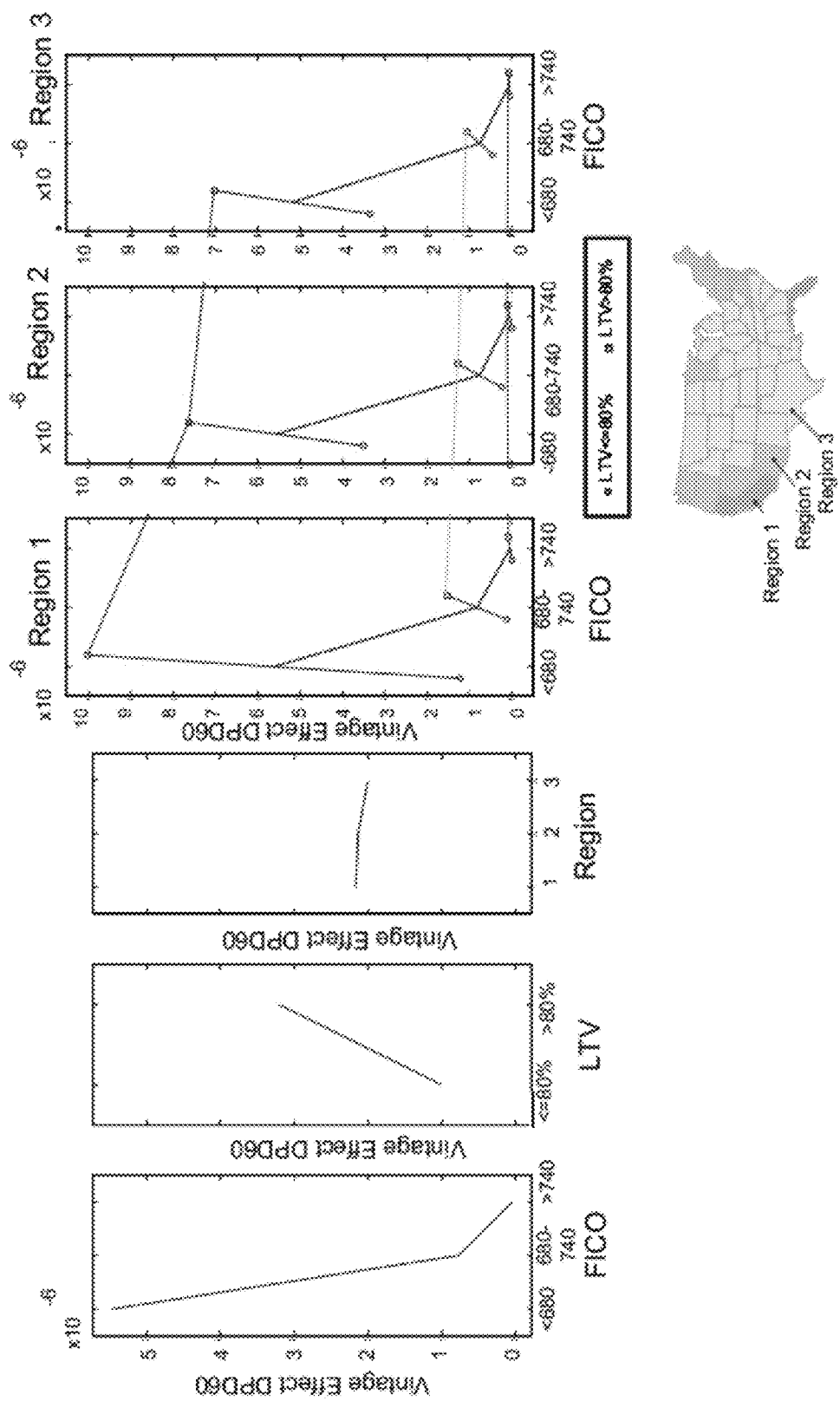
FIG. 11 is an illustrative vintage effect factor analysis chart in accordance with at least one aspect of the present disclosure.

FIG. 7 is an illustrative diagram of an example vintage effect decomposition of net credit loss in accordance with at least one aspect of the present disclosure. FIG. 11 is an illustrative vintage effect factor analysis chart in accordance with at least one aspect of the present disclosure. Such an output may be generated as part of the vintage effect data 313.

Figure 8:
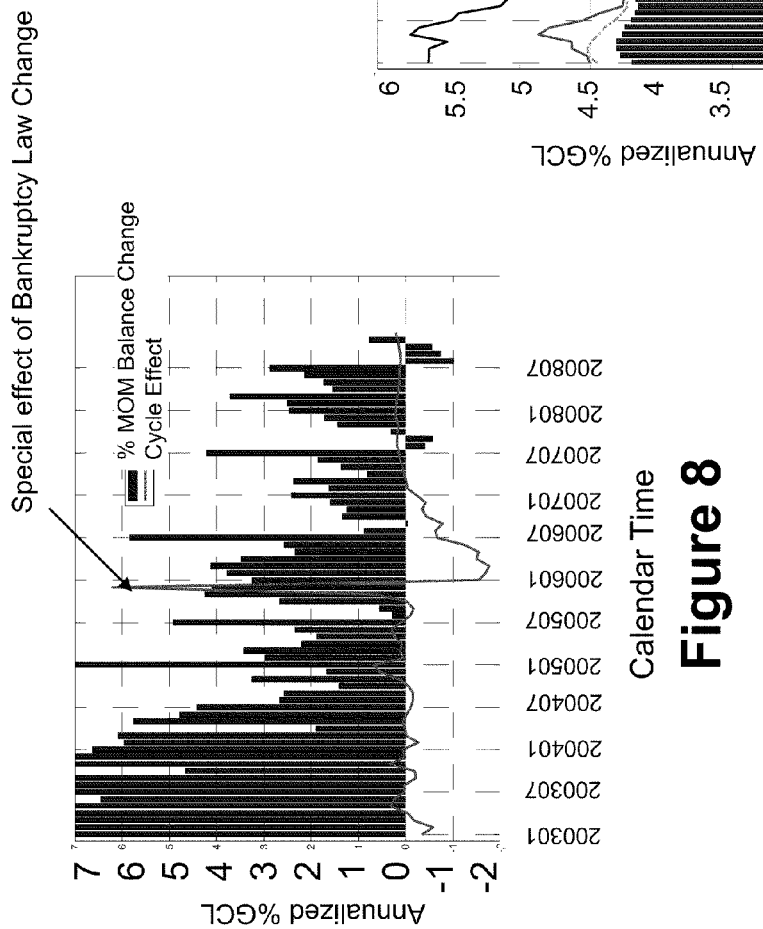
FIG. 8 is an illustrative diagram of an example cycle effect decomposition of net credit loss in accordance with at least one aspect of the present disclosure.
Figure 12:
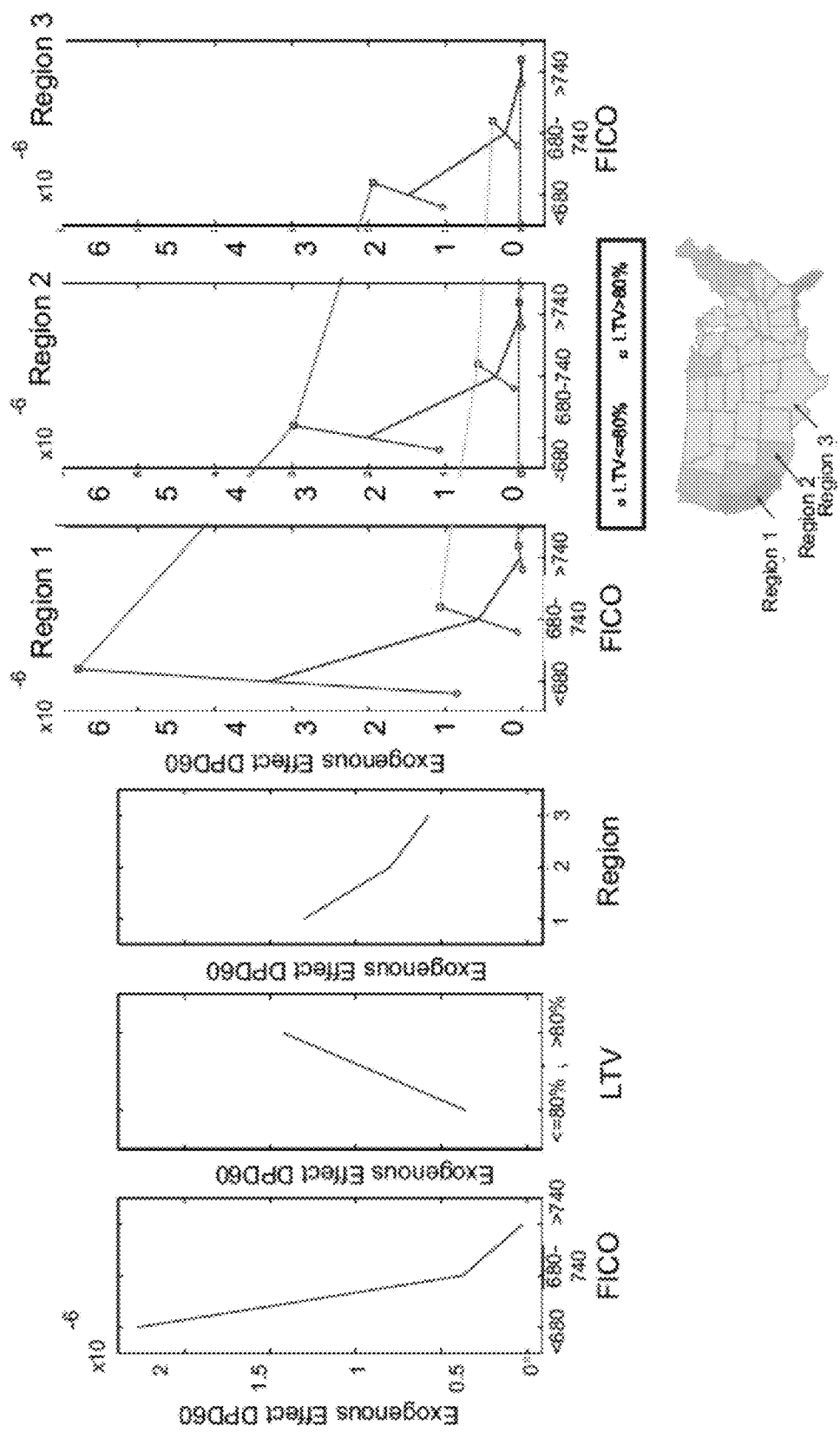
FIG. 12 is an illustrative cycle effect factor analysis chart in accordance with at least one aspect of the present disclosure.
Figure 13:
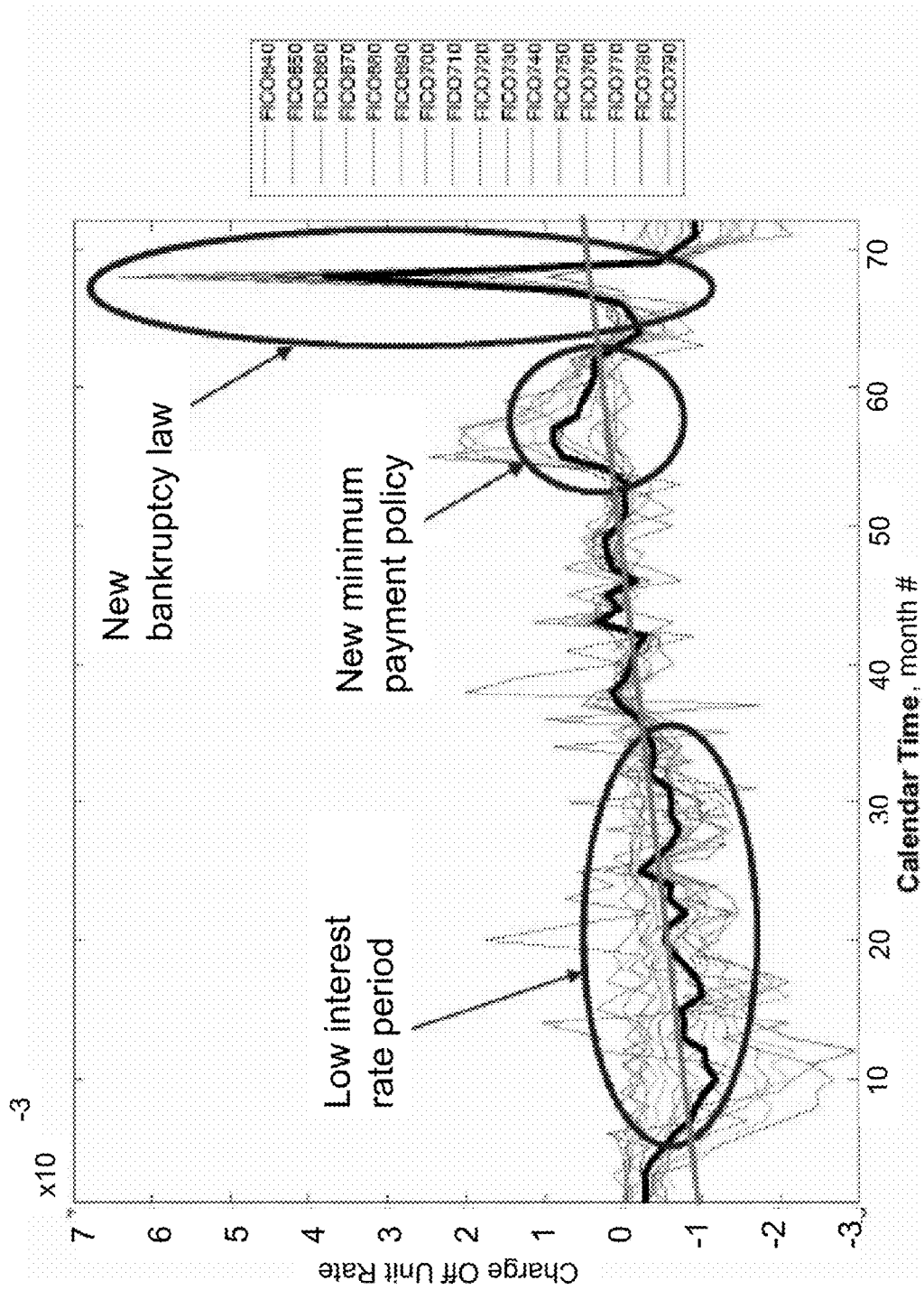
FIG. 13 is an illustrative chart isolating special causes in a cycle effect in accordance with at least one aspect of the present disclosure.

FIG. 8 is an illustrative diagram of an example cycle effect decomposition of net credit loss in accordance with at least one aspect of the present disclosure. FIG. 12 is an illustrative cycle effect factor analysis chart in accordance with at least one aspect of the present disclosure. FIG. 13 is an illustrative chart isolating special causes in a cycle effect in accordance with at least one aspect of the present disclosure. Such outputs may be generated as part of the cycle effect data 311. With respect to FIG. 13, the outputted data may be useful in identifying temporal changes that may be correlated to known events, such as a low interest rate or a new bankruptcy policy.

Figure 5:
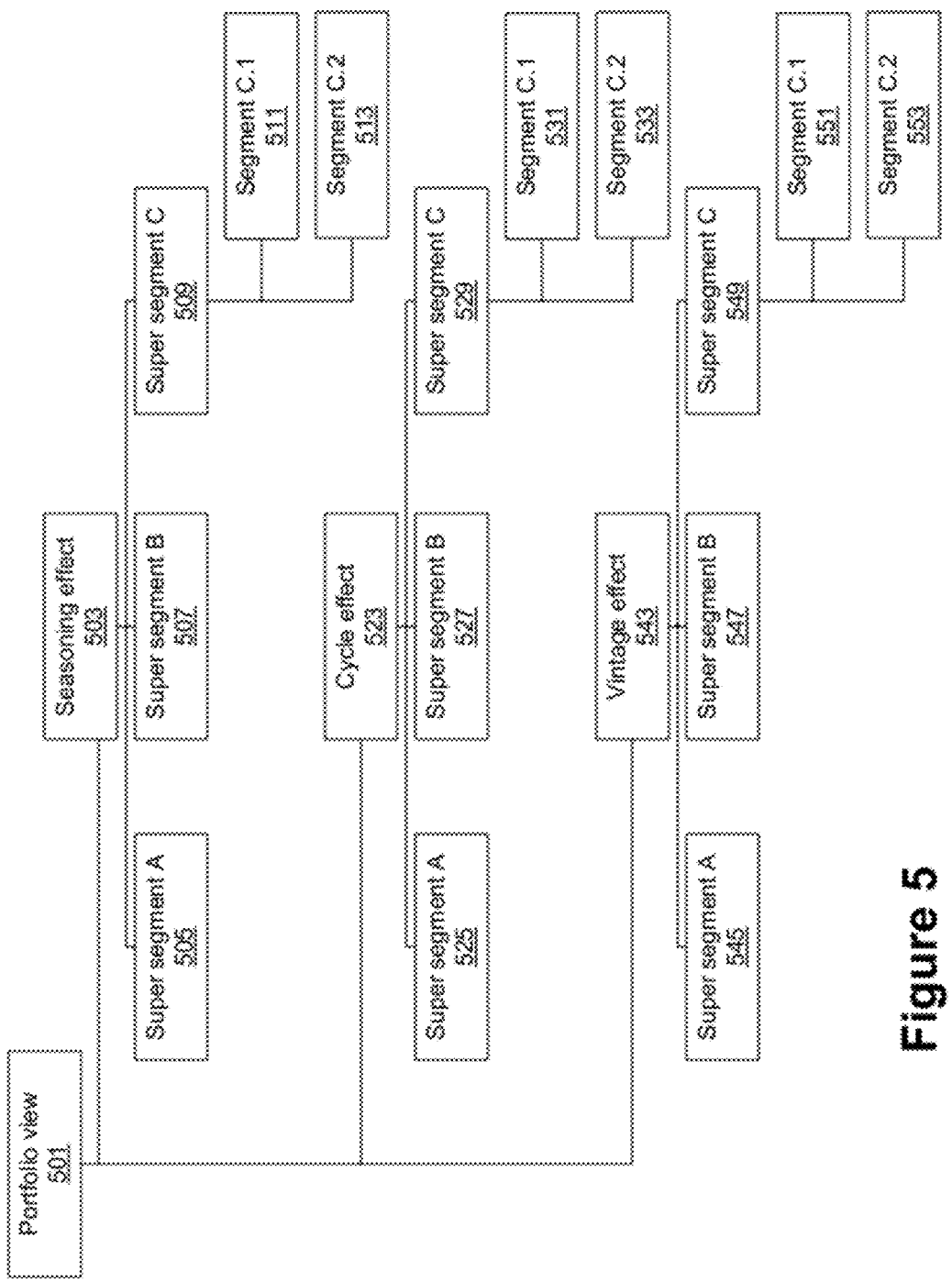
FIG. 5 is a block diagram of an illustrative hierarchical view of segmented effects in accordance with at least one aspect of the present disclosure.

Moving to step 315 in FIG. 3, segment clustering may occur where certain segments of seasoning effect data, cycle effect data, and/or vintage effect data are accounted for together. FIG. 5 is a block diagram of an illustrative hierarchical view of segmented effects in accordance with at least one aspect of the present disclosure. As shown, an entire portfolio view 501 may be broken down by individual effects, such as seasoning effect 503, cycle effect 523, and vintage effect 543. In addition, the individual effects, 503, 523, and 543, may be further super segmented. Seasoning effect 503 is shown to include three super segments A 505, B 507, and C, 509. Super segment C 509 is shown to be further segmented to Segment C.1 511 and Segment C.2 513. Cycle effect 523 is shown to include three super segments A 525, B 527, and C, 529. Super segment C 529 is shown to be further segmented to Segment C.1 531 and Segment C.2 533. Vintage effect 543 is shown to include three super segments A 545, B 547, and C, 549. Super segment C 549 is shown to be further segmented to Segment C.1 551 and Segment C.2 553. As should be understood, these Segments and Super Segments in FIG. 5 are merely illustrative and that other and additional segment levels may be utilized and/or incorporated within the present disclosure.

Figure 14:
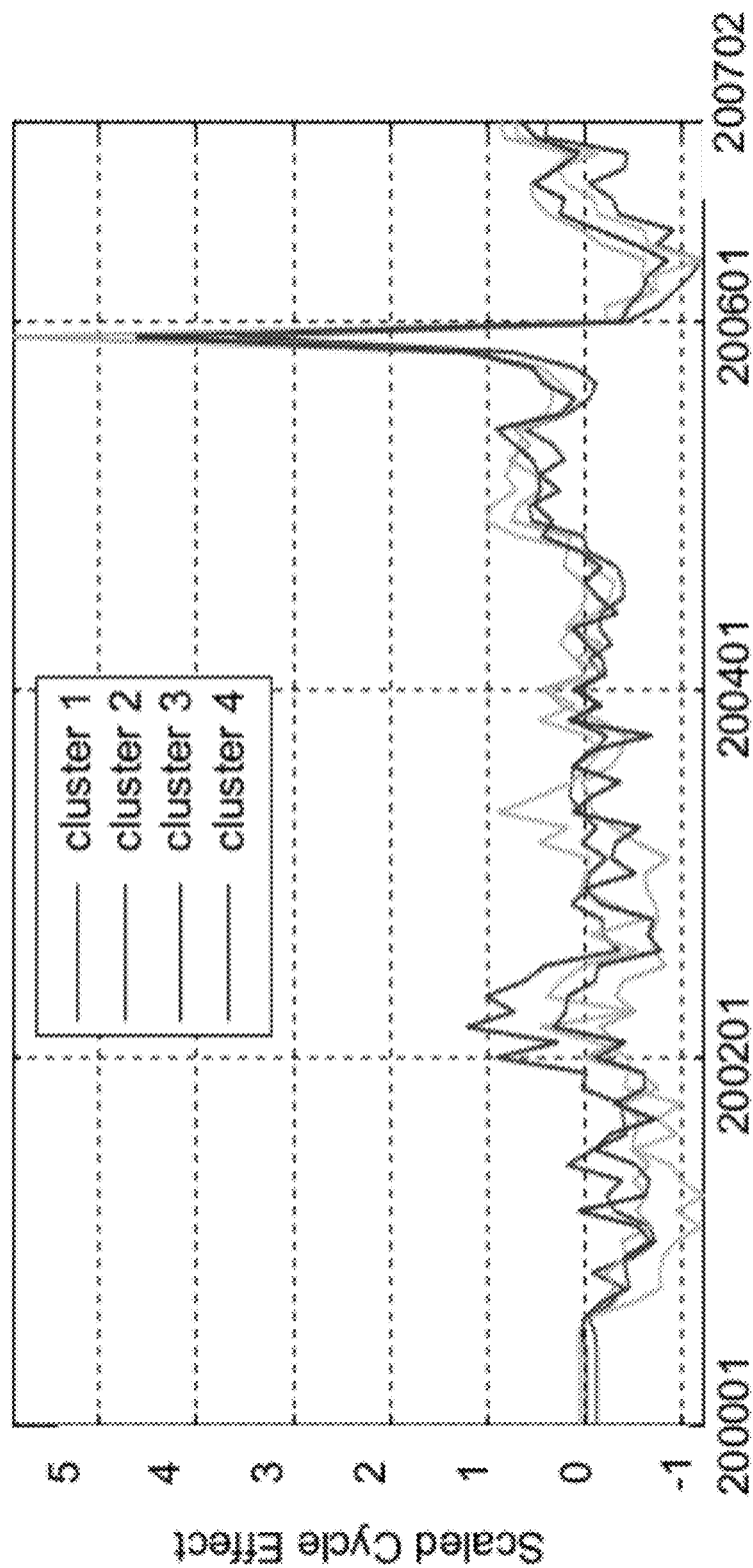
FIG. 14 is an illustrative chart for creating a cycle effect library for segment clusters in accordance with at least one aspect of the present disclosure.

The common cluster of cycle volatility represent how the segments within a cluster react similarly to common environmental factors. In accordance with one illustrative example, a mixture of Gaussian stochastic processes may be applied to identify optimal clusters. Each segment may have a different sensitivity to the common factor represented by the multitude of strength regression coefficients. The difference among clusters may indicate that each cluster volatility is driven by a different set of environmental factors. Each cluster may be linked to a distinct set of macroeconomic factors. FIG. 14 is an illustrative chart for creating a cycle effect library in accordance with at least one aspect of the present disclosure. In this example, four clusters are represented with respect to its scaled cycle effect over time.

FIGS. 15A-15D are illustrative charts for characterizing clusters of cycle volatility in accordance with at least one aspect of the present disclosure. In the example of FIG. 15A, a cluster 1 including 24 segments is shown with a representation of the cycle volatility with respect to three different variables. In the example of FIG. 15B, a cluster 2 including 22 segments is shown with a representation of the cycle volatility with respect to two of the three different variables from FIG. 15A. In the example of FIG. 15C, a cluster 3 including 15 segments is shown with a representation of the cycle volatility with respect to two of the three different variables from FIG. 15A.

Figure 16:
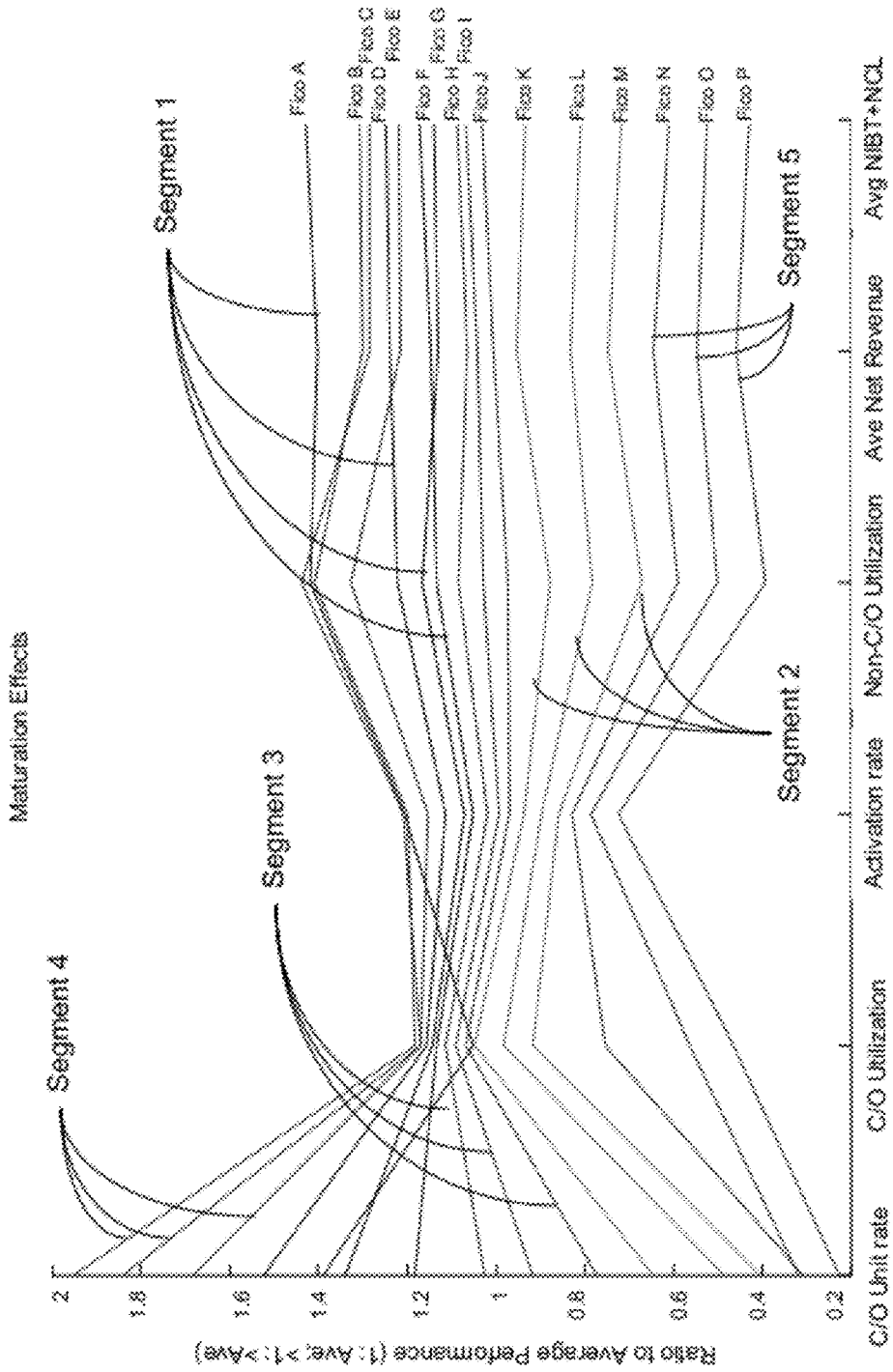
FIG. 16 is an illustrative clustering chart using seasoning effects of multiple risk/reward metrics in accordance with at least one aspect of the present disclosure.
Figure 17:
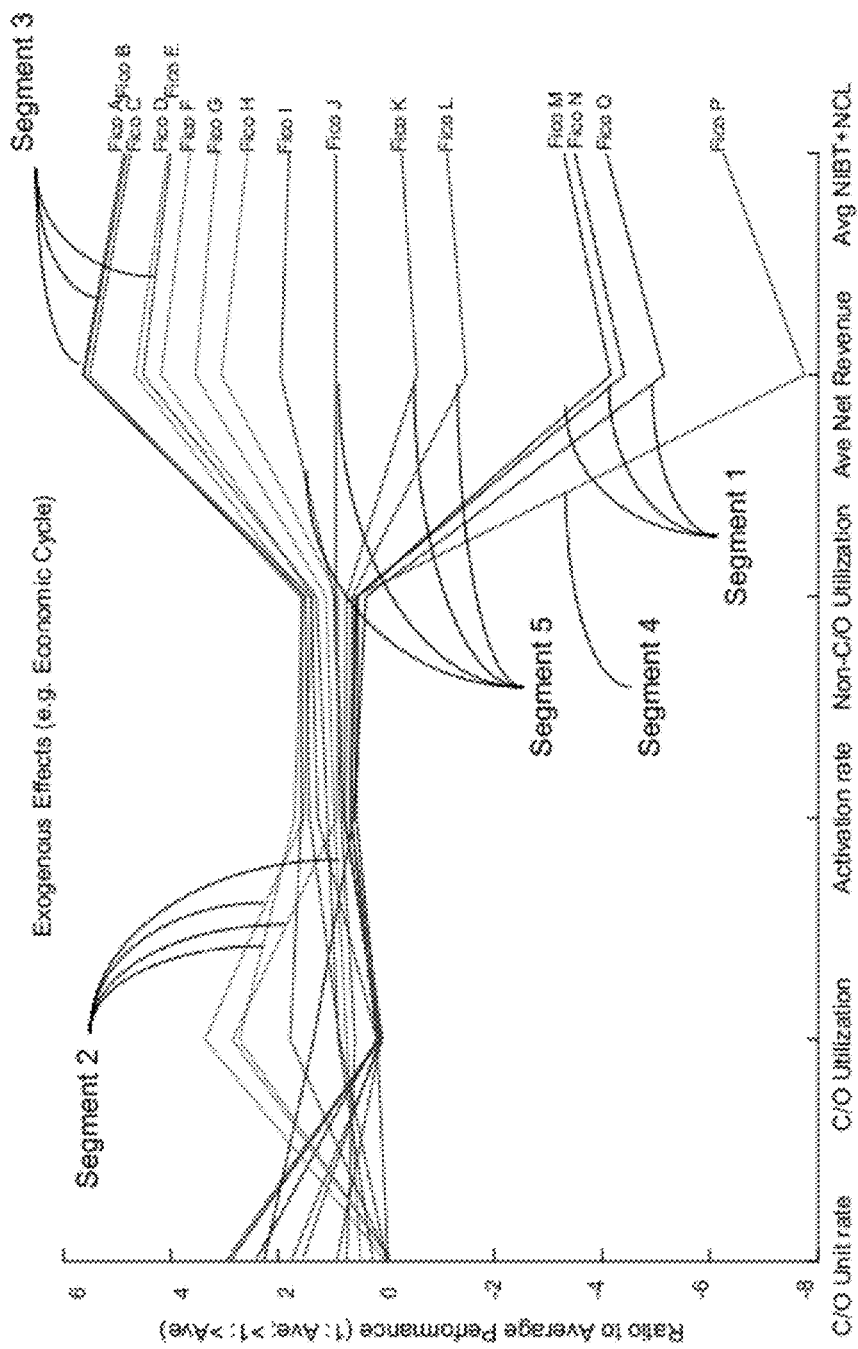
FIG. 17 is an illustrative clustering chart using cycle effects of multiple risk/reward metrics in accordance with at least one aspect of the present disclosure.

FIG. 16 is an illustrative clustering chart using seasoning effects of multiple risk/reward metrics in accordance with at least one aspect of the present disclosure. As shown, various segments 1-5 are illustrated with respect to various macroeconomic variables. FIG. 17 is an illustrative clustering chart using cycle effects of multiple risk/reward metrics in accordance with at least one aspect of the present disclosure. As shown, various segments 1-5 are illustrated with respect to various macroeconomic variables.

Returning to FIG. 3, from step 315, the clustered segments may be stored within a generated cluster decoder/encoder table in step 317. The table generated from step 317 may be an input for a model library decomposition process in step 319. The model library decomposition process in step 319 may also utilize the segmented customer data from step 305. The data from step 319 may then be stored in various libraries, including a vintage effect library 321, a seasoning effect library 323, and a cycle effect library 325. The data stored in libraries 321, 323, and 325 may also be outputted to a user as needed.

Figure 9:
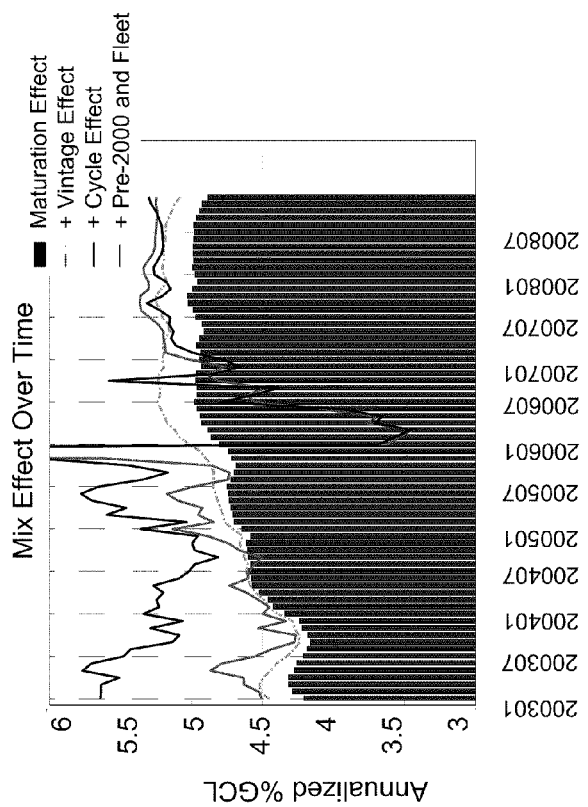
FIG. 9 is an illustrative diagram of an example total effect decomposition of net credit loss in accordance with at least one aspect of the present disclosure.

Proceeding from the libraries 321, 323, and 325, a prediction process may be utilized in addition to mixed effect decomposition. In step 329, a historical super segment and portfolio aggregation process may be implemented utilizing the data stored in vintage effect library 321, seasoning effect library 323, and/or cycle effect library 325. The output of step 329 may then be stored in step 331. FIG. 9 is an illustrative diagram of an example total effect decomposition of net credit loss in accordance with at least one aspect of the present disclosure. The chart illustrated in FIG. 9 may be generated from the data decomposed in step 329.

The prediction components of the aspects of the process of the present disclosure may include components 321-327, 333-345, and 349-353. Data from cycle effect library 325 may be inputted to an econometric variable and lag selection process in step 335. In addition, macroeconomic data and scenarios may be inputted to the process in step 335 from step 327. Macroeconomic data and scenarios may include baseline, bull, and bear economic scenarios. From step 335, an econometric model may be generated and stored in step 339. Concurrently, output from the macroeconomic data and scenarios in step 327 is inputted into a stochastic process model and simulation in step 337. Output from step 337 may be stored as macroeconomic volatility simulation and scenarios in step 349.

The output of step 349 may be inputted to a credit cycle simulation and prediction process in step 351. In addition, data from the econometric model stored in step 339 also may be inputted into the process in step 351. Output of the credit cycle simulation and prediction process in step 351 may be stored in step 353. The cycle effect prediction data in step 353 may be outputted to a user as needed.

Figure 18:
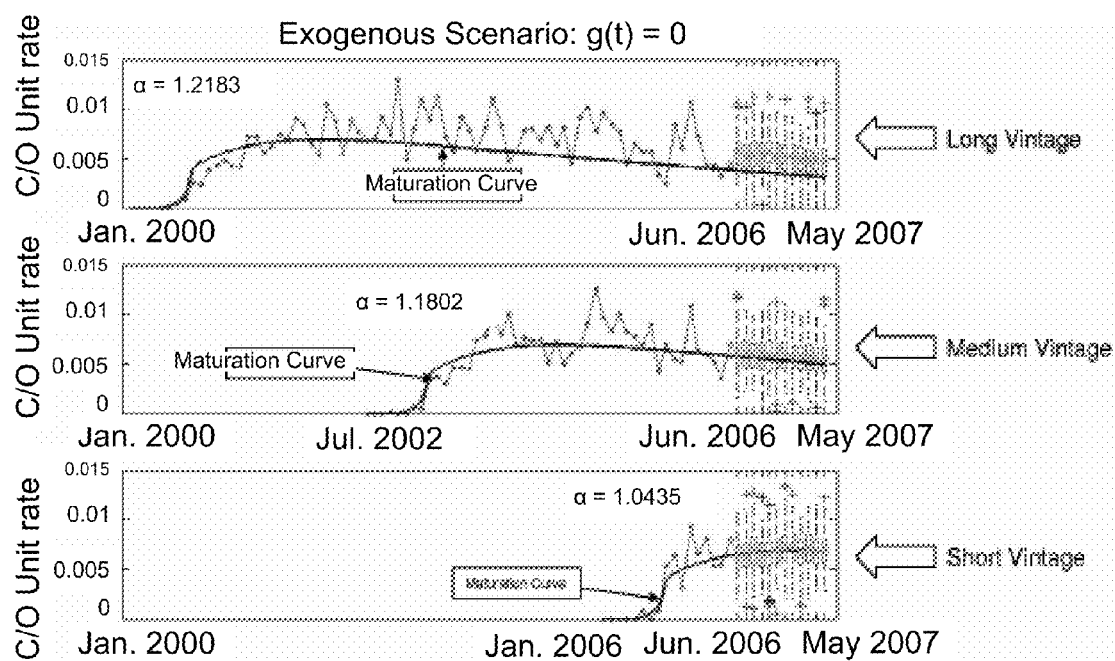
FIG. 18 are illustrative life cycle vintage prediction and simulation charts in accordance with at least one aspect of the present disclosure.
Figure 19:
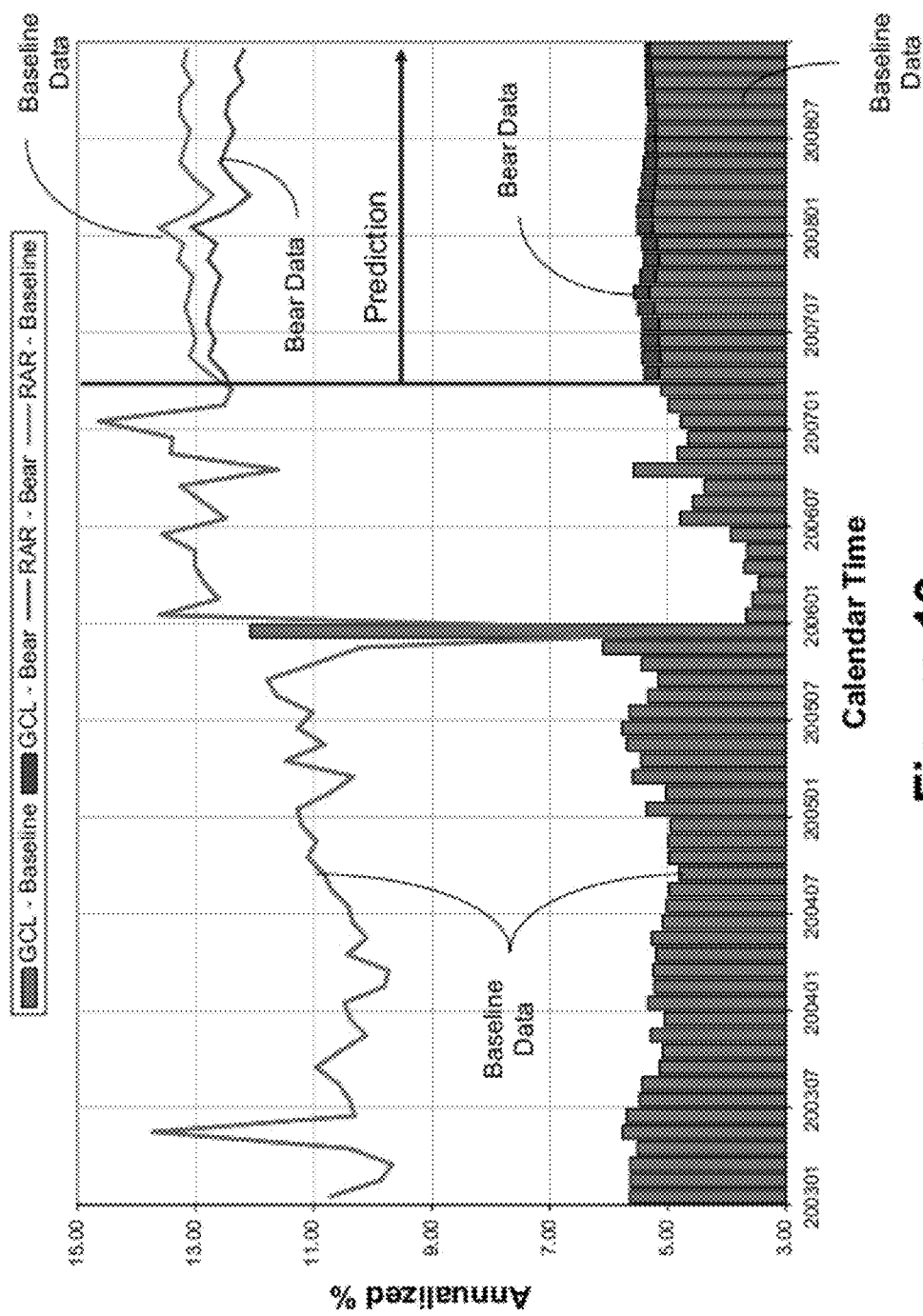
FIG. 19 is an illustrative sensitivity analysis of portfolio risk and return for various economic scenarios in accordance with at least one aspect of the present disclosure.

The cycle effect prediction data from step 353 may be inputted to a segment and portfolio prediction process in step 343. In addition, historical trend data from step 333, that includes various data from vintage effect library 321, seasoning effect library 323, and cycle effect library 325, may be inputted to the segment and portfolio prediction process in step 343. Still further, data with respect to new acquisition and portfolio management plans stored in step 341 may be inputted in the segment and portfolio prediction process in step 343. Output of the segment and portfolio prediction process in step 343 may be stored in step 345. The performance forecast data in step 345 may be outputted to a user as needed. FIG. 18 are illustrative life cycle vintage prediction and simulation charts in accordance with at least one aspect of the present disclosure. In the example, a principle seasoning curve for various vintages is shown. FIG. 19 is an illustrative sensitivity analysis of portfolio risk and return for various economic scenarios, such as a baseline and a bear, in accordance with at least one aspect of the present disclosure.

The optimization components of the aspects of the process of the present disclosure may include components 341-347 and 351-359. Output data from performance forecast process in step 345 may be inputted into a portfolio optimization process in step 357. In addition, the cycle effect prediction data stored in step 353 may be inputted into the portfolio optimization process in step 357. Still further, other data, such as business constraints and growth target data stored in step 355 may be accounted for and inputted into the portfolio optimization process in step 357. Output of the portfolio optimization process in step 357 may be stored in step 359. The efficient frontier data stored in step 359 may be outputted to a user as needed. The efficient frontier data in step 359 may include alternative balance allocations for the portfolio, an optimal acquisition plan, and performance benchmarks.

In an alternative embodiment, an automated feedback loop 361 may be used to enable assessment of assumptions utilized in the overall process. When utilizing such an automated feedback loop, a determination may be made as to whether a forecast was off due to model error or due to input error. Such a determination may be useful when trying to evaluate an impact of strategy and policy, e.g., vintage effect. There may be a defined cut-off between utilizing a modeled vintage effect on a vintage, such as where vintage equals or is older than 15 months, and utilizing a business assumption on a vintage, such as where vintage is less than 15 months. Accuracy of the first transition month may be assessed to assess how well the process is forecasting. The immediate feedback may increase the accuracy of the model and provide increased accuracy of future forecasts.

Figure 20:
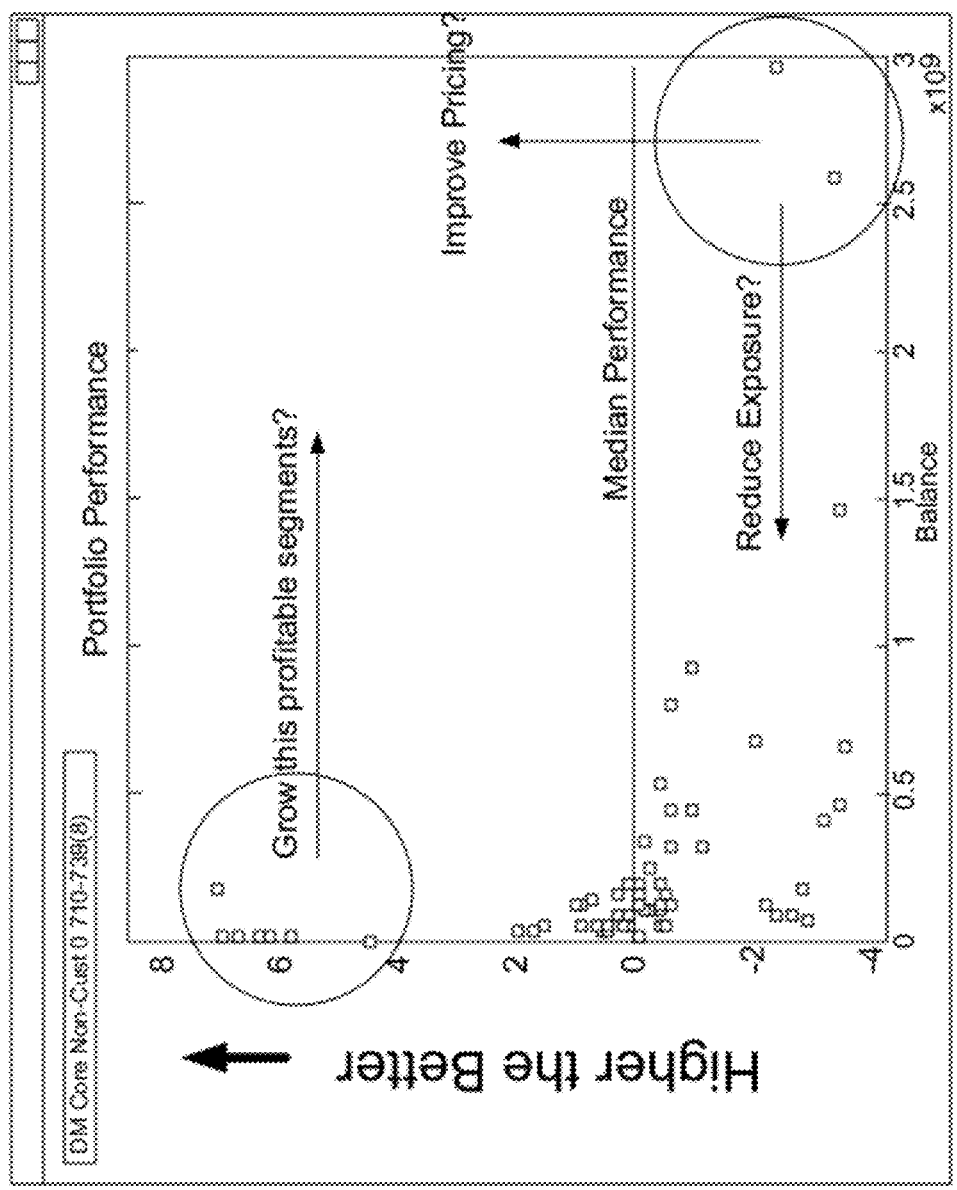
FIG. 20 is a graphical user interface depicting a segment risk/reward ratio in accordance with at least one aspect of the present disclosure.
Figure 21:
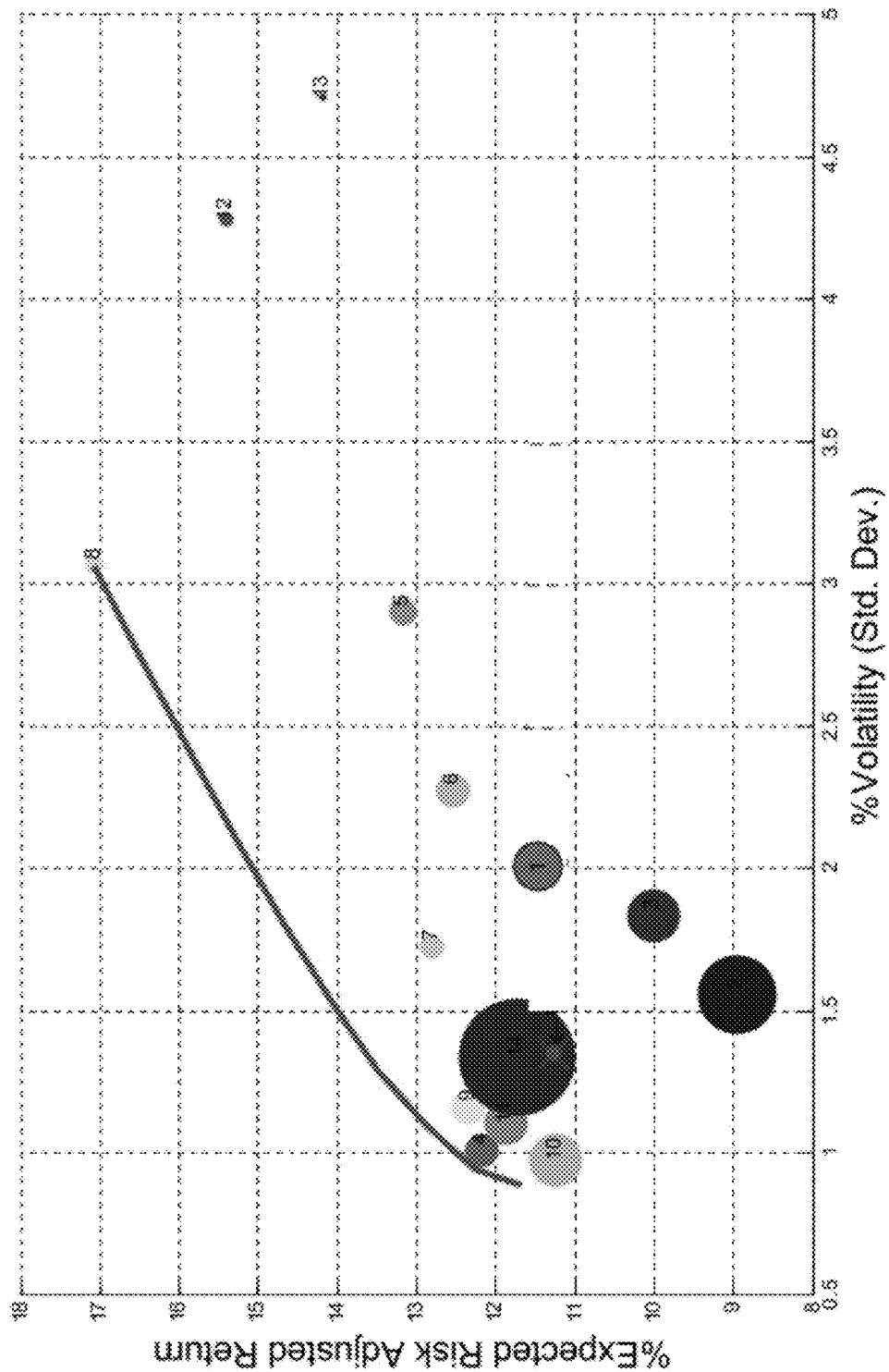
FIG. 21 is an illustrative chart for characterizing risk and reward for portfolios in accordance with at least one aspect of the present disclosure.

FIG. 20 is a graphical user interface depicting a segment risk/reward ratio in accordance with at least one aspect of the present disclosure. Comparing segment risk/reward performance relative to each other may be utilized to set a direction for origination and account management. The effects of management may be seen with respect to a medium performance line and variables and effects may be taken into account to predict the effect of changing one or more variables. FIG. 21 is an illustrative chart for characterizing risk and reward for portfolios in accordance with at least one aspect of the present disclosure. The line illustrates an optimal percent expected risk adjusted return with respect to percent volatility of a portfolio. This illustrative chart identifies the current status and can show the effect of change and/or prediction.

Figure 22A:
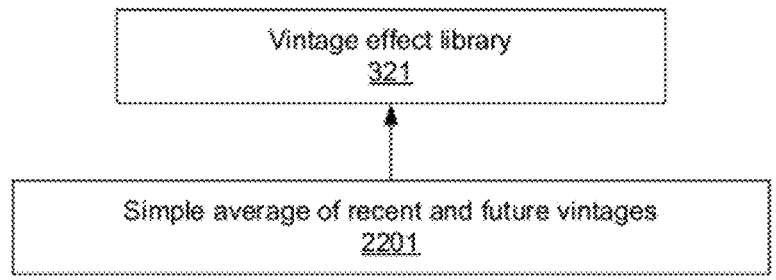
FIGS. 22A and B are a flow chart and diagram of another illustrative method for forecasting expected values and volatilities of revenue and loss and optimizing a business's portfolio in accordance with at least one aspect of the present disclosure.

FIGS. 22A and B are a flow chart and diagram of another illustrative method for forecasting expected values and volatilities of revenue and loss and optimizing a business's portfolio in accordance with at least one aspect of the present disclosure. Decomposition, i.e., separation, of maturation effects from vintage effects and from cycle effects is one aspect of the present disclosure. For a business, aspects of the present disclosure with respect to decomposition may reduce assumptions when making policy changes from credit loosening or tightening efforts. When a credit policy change is made within a segment, it may be difficult to know the true impact because there are other factors, such as exogenous effects and economic stress, impacting the results of the policy change. In accordance with one or more aspects herein, factors that impact performance after controlling for the economic cycle may be isolated. Such a system may capture business strategies into the modeling framework directly with a higher degree of accuracy.

Figure 22B:
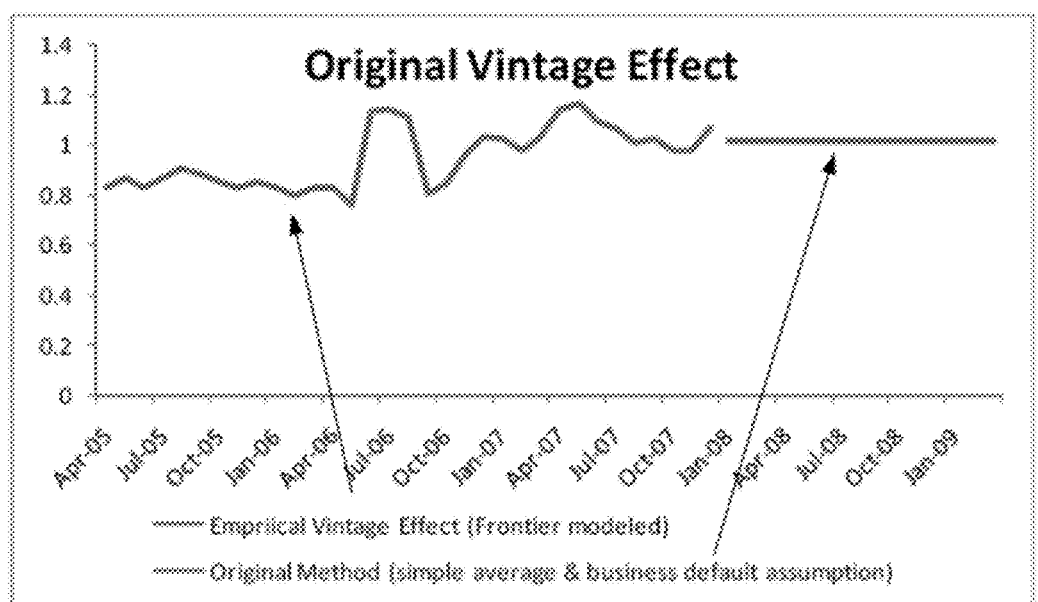

As shown in FIG. 22A, in accordance with aspect of the present disclosure, a vintage effect factor (VEF) on recent and future vintages with respect to a vintage effect library, such as vintage effect library 321 from FIG. 3, may be an average of prior vintage effect factors 2201. Vintage effect factors on older vintages may be calculated by one or more features of a risk reward assessment mechanism as described herein using observed, empirical data with reasonable accuracy. FIG. 22B illustrates a diagram of segmented effects based upon an average of prior vintage effect factors. As shown, an average is utilized for future forecasting.

Figure 23A:
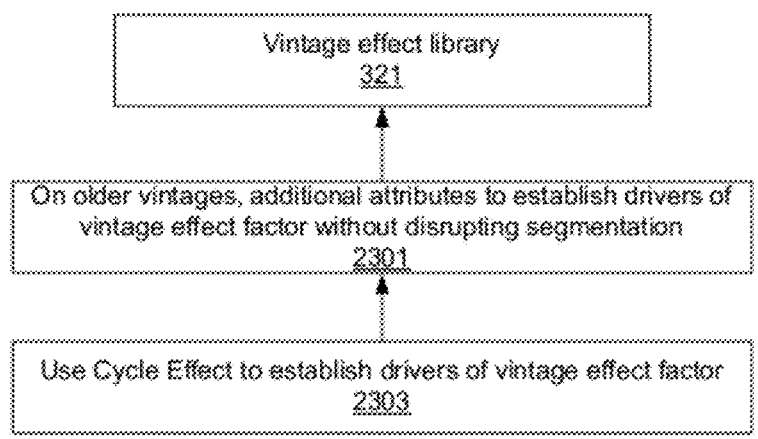
FIGS. 23A and B are a flow chart and diagram of another illustrative method for forecasting expected values and volatilities of revenue and loss and optimizing a business's portfolio in accordance with at least one aspect of the present disclosure.

FIGS. 23A and B are a flow chart and diagram of another illustrative method for forecasting expected values and volatilities of revenue and loss and optimizing a business's portfolio in accordance with at least one aspect of the present disclosure. In accordance with one embodiment, recent and future vintages may not have enough, or any, observed data.

Under such an embodiment, a risk reward appetite mechanism may not calculate the vintage effect factor with reasonable accuracy. In accordance herein, one aspect of the present disclosure solves for the vintage effect factor on recent and future vintages.

Figure 23B:
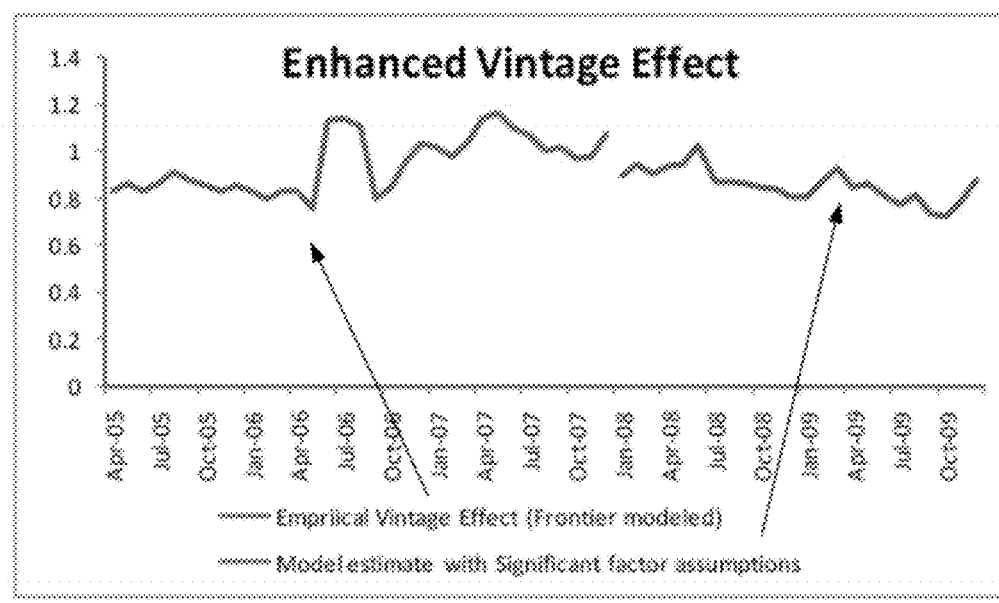

As shown in FIG. 23A, in accordance with aspects of the present disclosure, on older vintages, additional attributes may be captured to establish drivers of a vintage effect factor without disrupting segmentation 2301. Thus, segmentation described in components 305, 315, and 329 of FIG. 3, components 403 and 427 of FIG. 4, and components 543 and 553 of FIG. 5 are able to be maintained, e.g., not disrupted. As part of the capturing of additional attributes, the cycle effect from the risk reward assessment mechanism process as one of the additional performance drivers may be used to establish drivers of the vintage effect factor 2303. Both seasoning and cycle impacts may be taken into calculating a vintage effect without resulting in significant changes to an existing segmentation scheme. FIG. 23B illustrates a diagram of segmented effects based upon the additional attributes in 2301 and cycle effect in 2303. As shown, a model estimate is utilized for future forecasting.

Figure 24:
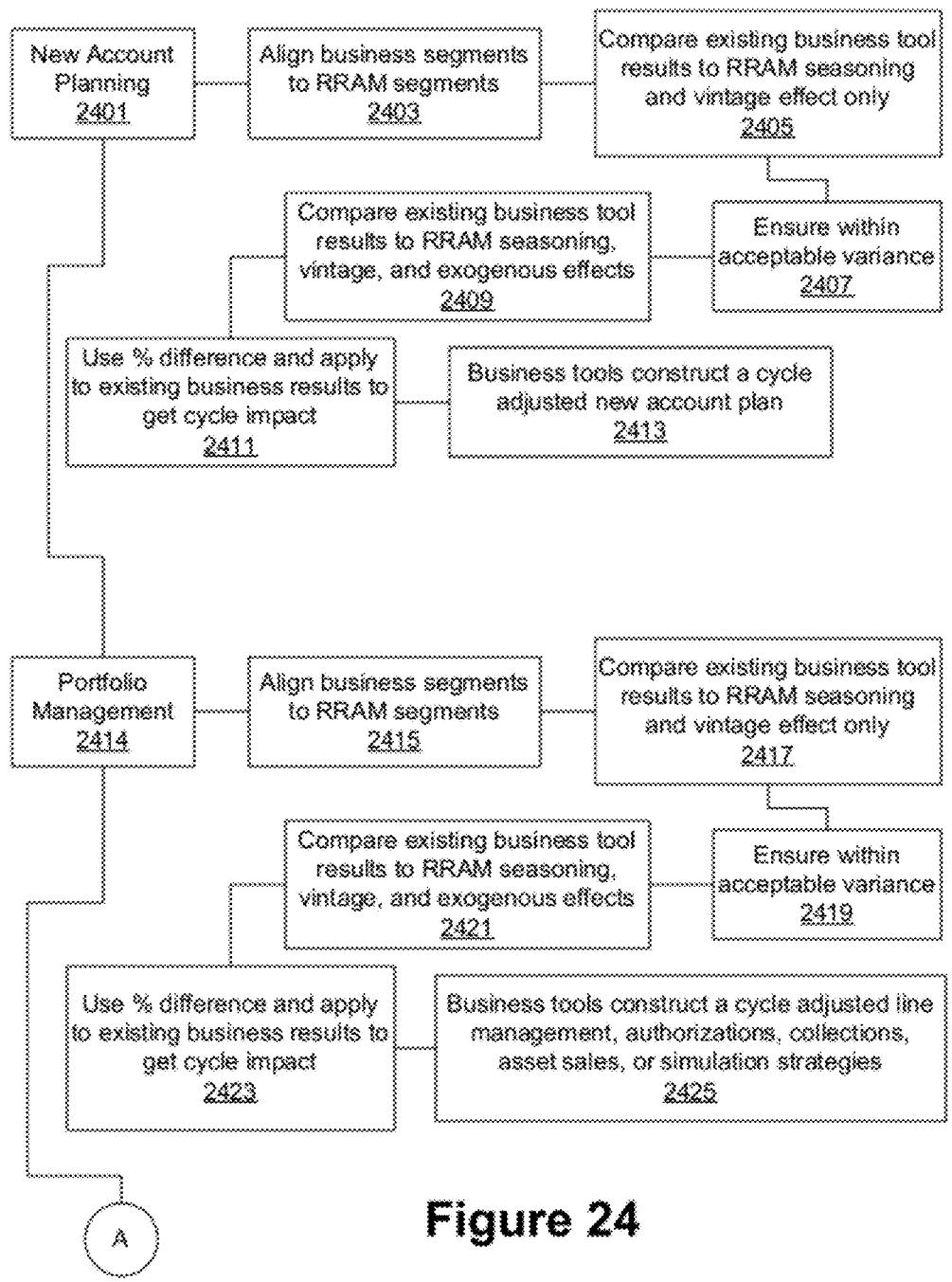
FIG. 24 is a block diagram of another illustrative risk reward assessment process in accordance with at least one aspect of the present disclosure.
Figure 24:
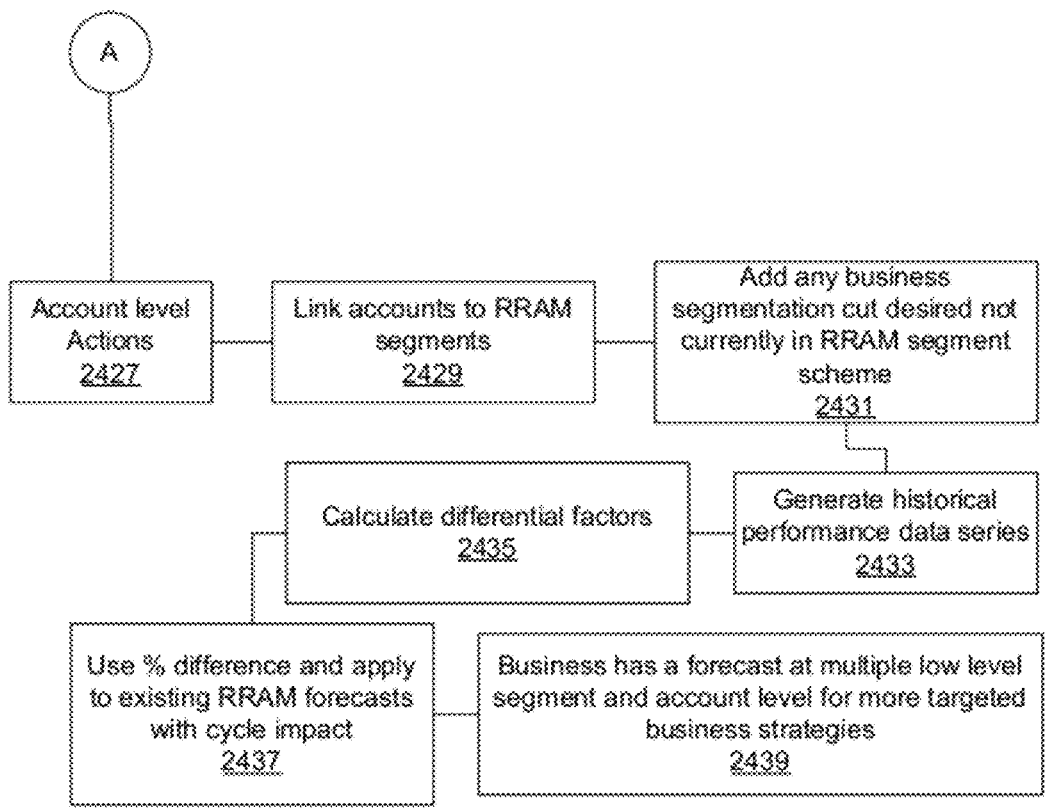

FIG. 24 is a block diagram of another illustrative risk reward assessment process in accordance with at least one aspect of the present disclosure. Through process design and process integration with existing tools, a risk reward assessment mechanism tool may be used to influence new account plans 2401, portfolio management 2414, forecasting, asset sales, securitizations, and collections 2427. Aspects of the description of FIG. 24 may correspond to the strategy development element 409 in FIG. 4.

As shown in FIG. 24, new account planning 2401 may be influenced by a risk reward assessment mechanism in accordance with aspects herein. In 2403, business segments may be aligned to segments of the risk reward assessment mechanism as described herein. In step 2405, existing business tool results may be compared to seasoning and vintage effects of the risk reward assessment mechanism. As shown, only the seasoning and vintage effects are compared. Proceeding to 2407, the comparison is ensured to be within an acceptable variance to account for other discrepancies. In step 2409, the existing business tool results from 2407 may be compared to seasoning, vintage, and exogenous effects of the risk reward assessment mechanism. As shown, the exogenous effect is included in the comparison. Proceeding to step 2411, the percent difference in the comparison from 2409 may be used and applied to the existing business results to obtain the cycle impact. In step 2413, the risk reward assessment mechanism may construct a cycle adjusted new account plan in accordance with the obtained cycle impact. As such, new account planning 2401 is influenced.

Portfolio management 2414 may be influenced by a risk reward assessment mechanism in accordance with aspects herein. In 2415, business segments may be aligned to segments of the risk reward assessment mechanism as described herein. In step 2417, existing business tool results may be compared to seasoning and vintage effects of the risk reward assessment mechanism. As shown, only the seasoning and vintage effects are compared. Proceeding to 2419, the comparison is ensured to be within an acceptable variance to account for other discrepancies. In step 2421, the existing business tool results from 2419 may be compared to seasoning, vintage, and exogenous effects of the risk reward assessment mechanism. As shown, the exogenous effect is included in the comparison. Proceeding to step 2423, the percent difference in the comparison from 2421 may be used and applied to the existing business results to obtain the cycle impact. In step 2425, the risk reward assessment mechanism may construct a cycle adjusted line management, authorizations, collections, asset sales, and/or simulation strategies in accordance with the obtained cycle impact. As such, portfolio management 2414 is influenced.

Account level actions 2427 may be influenced as well. In 2429, accounts may be linked to risk reward assessment mechanism segments. Proceeding to step 2431, any business segmentation cut desired not currently in the risk reward assessment mechanism segment scheme may be added. Historical performance data series may be generated in step 2433. Differential factors may be calculated in 2435. Proceeding to step 2437, based upon the generated historical performance data series and calculated differential factors, the percent difference may be used and applied to the existing risk reward assessment mechanism forecasts with cycle impact. In step 2439, the risk reward assessment mechanism allows a business to have a forecast at multiple low level segment and account level for more targeted business strategies. As such, account level actions 2427 are influenced.

Figure 25:
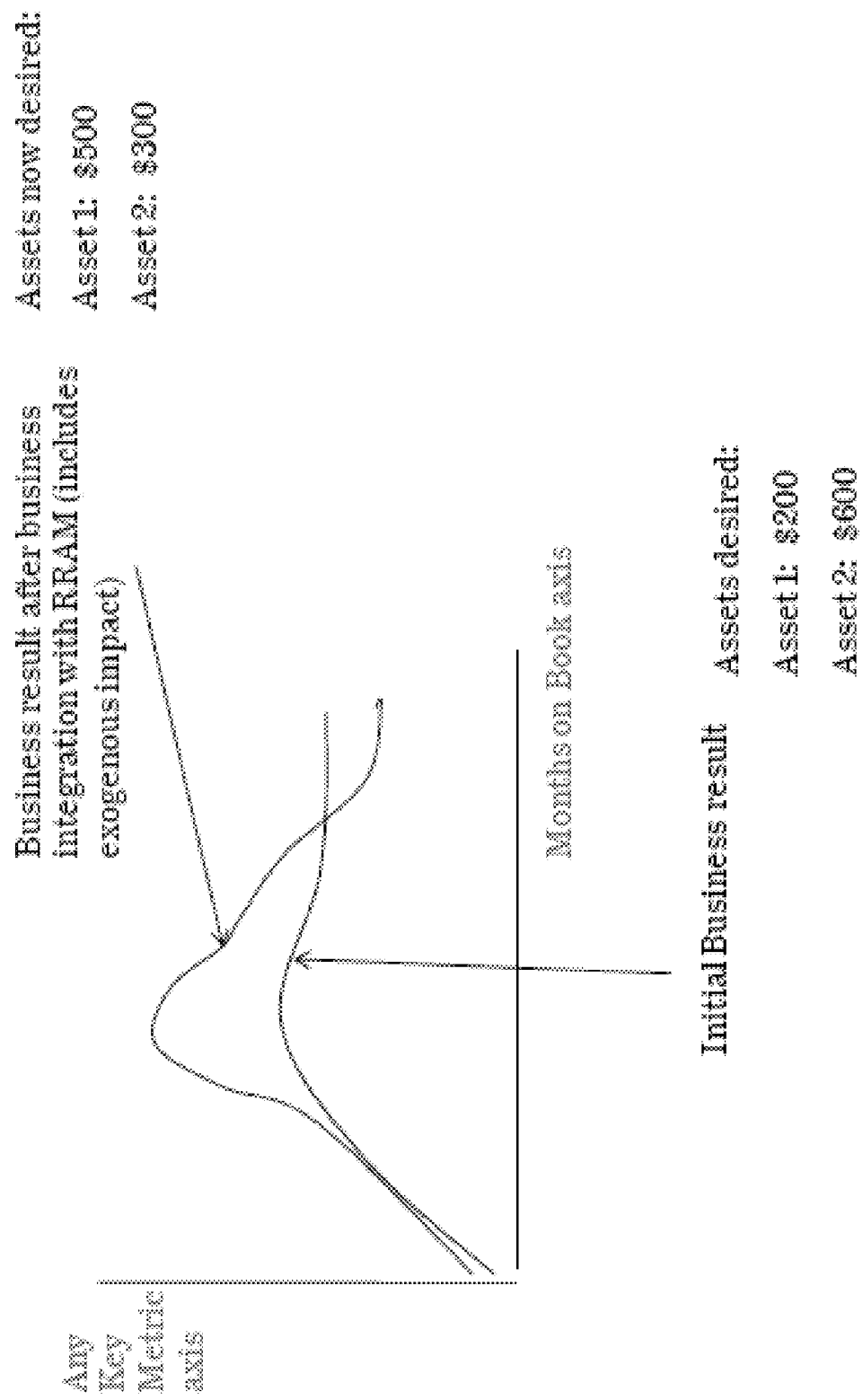
FIG. 25 is a diagram of utilization of the illustrative risk reward assessment process in FIG. 24.

FIG. 25 is a diagram of utilization of the illustrative risk reward assessment mechanism process in FIG. 24. FIG. 25 illustrates a diagram highlighting a new account planning example and a portfolio actions example. FIG. 26 is another diagram of utilization of the illustrative risk reward assessment mechanism process in FIG. 24. FIG. 26 illustrates a diagram highlighting an account level decisions example.

Figure 27:
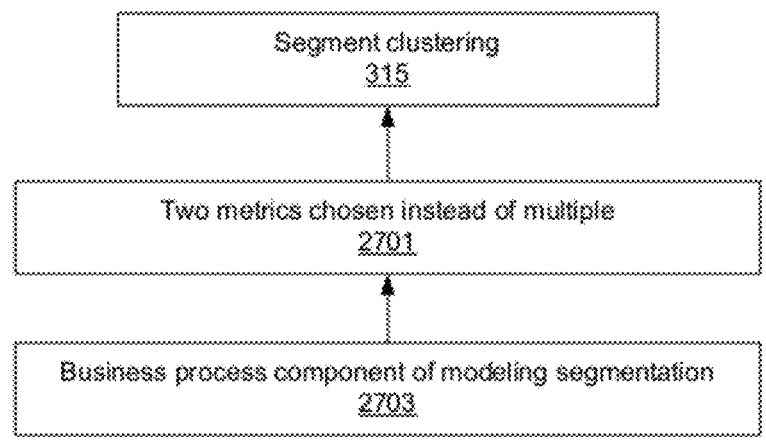
FIG. 27 is a flow chart of another illustrative method for forecasting expected values and volatilities of revenue and loss and optimizing a business's portfolio in accordance with at least one aspect of the present disclosure.

FIG. 27 is a flow chart of another illustrative method for forecasting expected values and volatilities of revenue and loss and optimizing a business's portfolio in accordance with at least one aspect of the present disclosure. Alignment and clustering of segments is described herein. To deal with the merger of two legacy portfolios, new combined business segments may be mapped to one or more of the legacy portfolio segments. In certain circumstances and due to a short history of the new combined business, the maturation and vintage portion for a combined business segment may be mapped to legacy segment A, but the cycle relationship may be mapped to legacy segment B. Such an embodiment improves accuracy. It is not necessary to map all aspects of maturation, vintage, and cycle to the same legacy segment.

Figure 28:
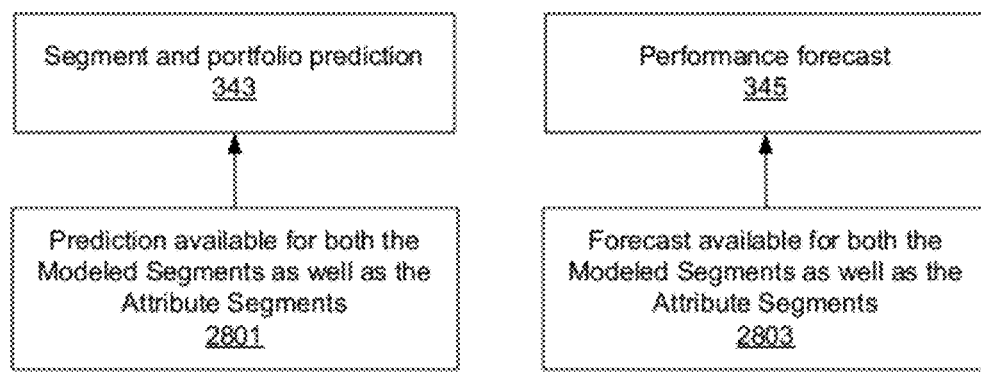
FIG. 28 is a flow chart of another illustrative method for forecasting expected values and volatilities of revenue and loss and optimizing a business's portfolio in accordance with at least one aspect of the present disclosure.

FIG. 27 illustrates an alternative embodiment to the operation of segment clustering 315 in FIG. 3. As shown in FIG. 27, segment clustering 315 includes choosing two metrics 2701 instead of three or more metrics. In addition, a business process component 2703 of modeling segmentation may be utilized. FIG. 28 is a flow chart of another illustrative method for forecasting expected values and volatilities of revenue and loss and optimizing a business's portfolio in accordance with at least one aspect of the present disclosure. FIG. 28 illustrates an alternative embodiment to the operation of segment and portfolio prediction 343 in FIG. 3. As shown in FIG. 28, segment and portfolio prediction 343 includes prediction available for the modeled segments as well as the attribute segments 2801. In addition, FIG. 28 illustrates an alternative embodiment to the operation of performance forecast 345 in FIG. 3. As shown in FIG. 28, performance forecast 345 includes forecast available for the modeled segments as well as the attribute segments 2803.

Figure 29:
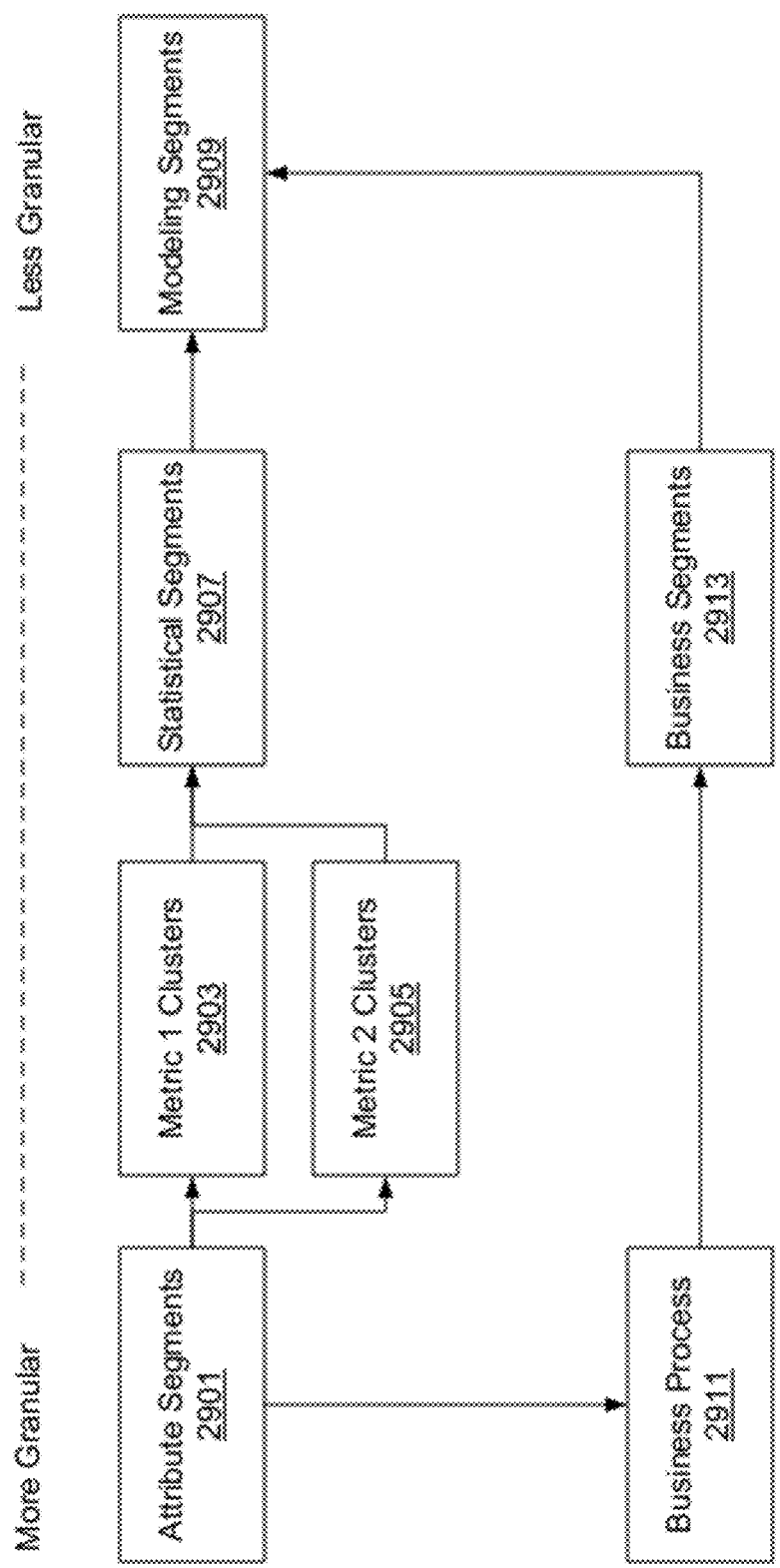
FIG. 29 is a flow chart of an illustrative method with respect to FIGS. 27 and 28 in accordance with at least one aspect of the present disclosure.

FIG. 29 is a flow chart of an illustrative method with respect to FIGS. 27 and 28 in accordance with at least one aspect of the present disclosure. As shown, attribute segments 2901 are clustered by two metric clusters, 2903 and 2905. FIG. 16 illustrates an alternative embodiment in which multiple metrics in excess of two are utilized. Metrics may be chosen based on their importance in distinguishing unique segment performance. Metrics may be clustered based on different types of effects. For example, metric 1 may use a clustering approach that is focused on the exogenous effect differences. Metric 2 may use a clustering method that is focused on the seasoning effect. This leads to statistical segments 2907, which are less granular than the attribute segments 2901.

In parallel, the business process 2911 identifies the attribute levels that are most important to the business. Business segments 2913 from the business process 2911 may be generated. The business segments are less granular than the attribute segments. To generate the modeling segments 2909, the business segments 2913 are utilized to determine if any material statistical segments exist. If only one material statistical segment exists, the business segment may remain intact. If multiple material statistical segments exist, the business segment may be sub-divided into sub-segments by attributes, which again are less granular than attribute segments 2901. Although inputs are gathered and modeled at the modeling segment level, the risk reward assessment mechanism results may be sent back to the granular attribute segment level. As such, forecasts at the attribute segment level may be created.

Figure 30:
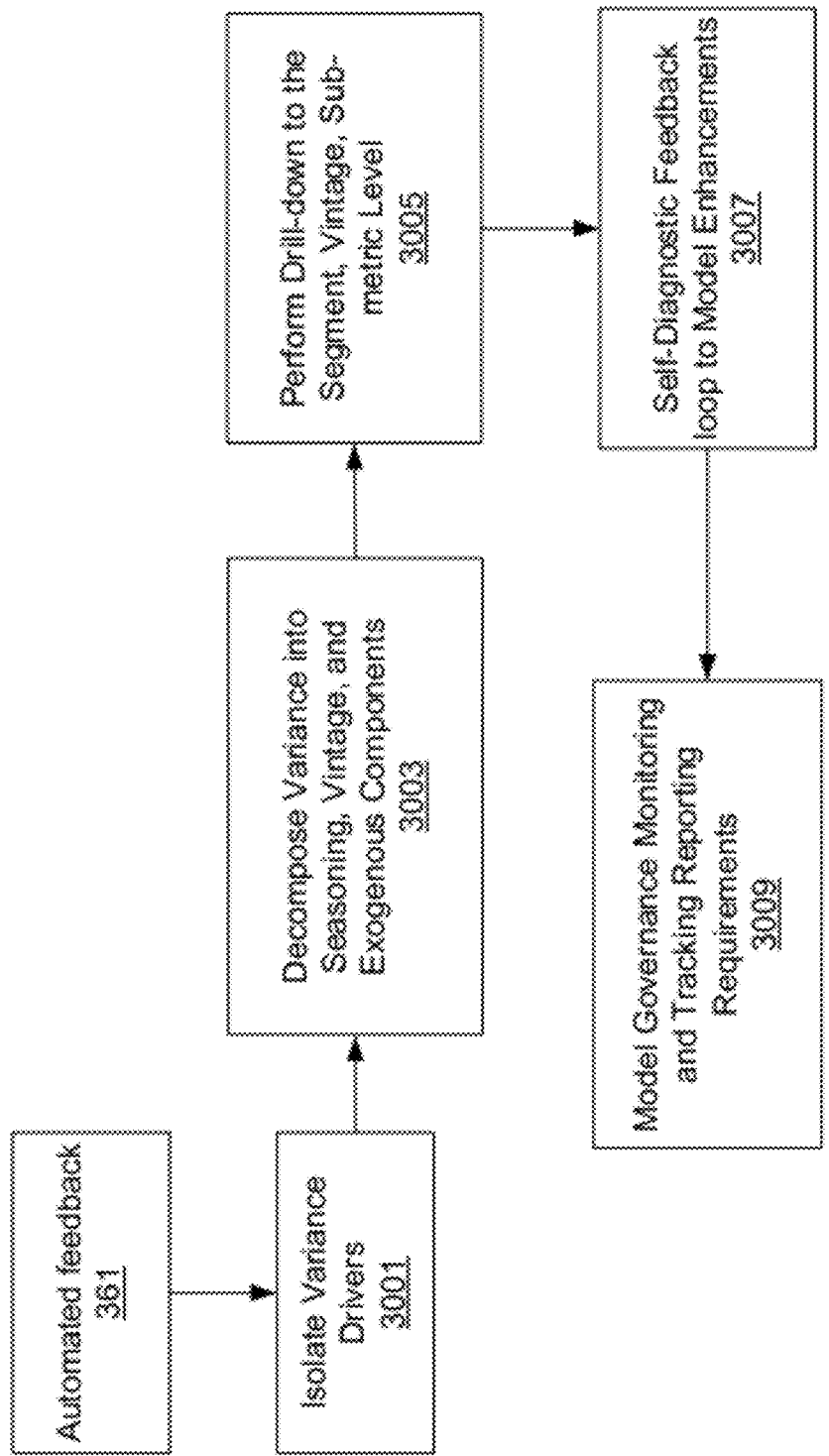
FIG. 30 is a flow chart of an illustrative method of holdout decomposition in accordance with at least one aspect of the present disclosure.

FIG. 30 is a flow chart of an illustrative method of holdout decomposition in accordance with at least one aspect of the present disclosure. In accordance with at least one embodiment, an automated feedback loop may be utilized to assess assumptions made in the risk reward assessment mechanism. By utilizing an automated feedback loop, a determination can be made as to whether a forecast was inaccurate due to an error associated with the overall process, risk reward assessment mechanism model, itself or due to an error associated with an input variable. Ascertaining the reason behind the inaccuracy in the forecast is helpful when trying to evaluate the impact of strategy and policy, i.e., the vintage effect. In accordance with at least one embodiment, there may be a defined cut-off between use of the modeled vintage effect on a vintage, where vintage is equal to or older/greater than 15 months, and use of a business assumption, where vintage is younger/less than 15 months. The accuracy of the first transition month may be assessed to determine how accurate the risk reward assessment mechanism process is operating. The immediate feedback may have an impact on the confidence in the model and it may provide a confidence interval of future forecasts. Aspects of the description of FIG. 30 may be utilized within component 361 in FIG. 3 and component 457 in FIG. 4.

An automated feedback loop may assess the forecasting power of the risk reward assessment mechanism model and may make targeted model improvements. Holdout decomposition, as described herein, assists in determining whether a forecast was inaccurate due to an error associated with the overall process, risk reward assessment mechanism model, itself or due to an error associated with an input variable. A model error is driven by an imprecise model specification and is calculated by comparing actual results to model results with actual inputs, i.e., back-testing or holdout. An assumptions error is driven by inaccurate input assumptions, such as economic scenarios, acquisition plans, recovery rates, cost of funds, prime rate, and the like.

An error may be decomposed into seasoning, vintage, and exogenous components to find out which component contributes most to the forecast error. A drill-down action into the segment, vintage, and metric levels may be performed to identify the variance drivers. Built-in automated triggers may focus model improvement efforts on the segments/vintages/metrics/inputs that exhibit errors outside of pre-determined tolerance levels. Holdout decomposition assists in identifying and correcting any forecasting bias. It also assists in evaluating the impact of model and/or assumption changes on forecasting accuracy.

With respect to FIG. 30, the process starts and variance drivers are isolated in step 3001. In 3001, multiple model holdout runs may be generated by changing one input, or one model change, at a time. These holdout runs may be compared to the original forecast and the actual metric values to split the total error into model and assumptions components. In step 3003, variance is decomposed into seasoning, vintage, and exogenous components. The decomposition into these three components may be performed by the risk reward assessment mechanism described herein for the forecasted, actual, and holdout periods.

Proceeding to 3005, the process may drill-down to the segment, vintage, sub-metric level. An automated web-based drill-down capability may perform filtering and may analyze the forecast accuracy at the lowest possible segment/vintage/metric level, or any pre-defined roll-up. In 3007, a self-diagnostic feedback loop to model enhancements may be implemented. The analysis of 3001, 3003, and 3005, may be combined with the built-in triggers to provide quick feedback to modelers for targeted model fixes and enhancements. Step 3009 includes model governance monitoring and tracking reporting requirements. A holdout decomposition process, as described herein, may be a part of the model governance process. A holdout decomposition process may provide reports to meet monitoring and tracking requirements, such as horizontal and vertical forecast accuracy analysis.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. One or more non-transitory computer readable media storing computer executable instructions that, when executed by at least one processor, cause the at least one processor to perform:
   collecting account level historical data for a plurality of customers associated with accounts as part of a portfolio of an entity;
   segmenting the account level historical data into a plurality of groups of customers of the plurality of customers with similar revenue and loss characteristics identified within the accounts of the customers;
   decomposing the segmented data into seasoning, vintage, and cycle effects;
   forming statistical clusters based upon the collected account level historical data, wherein the forming statistical clusters is based upon the seasoning, vintage, and cycle effects and the plurality of groups of customers;
   applying at least one simulation to the statistical clusters, the at least one simulation simulating revenue and loss volatility on the statistical clusters;
   generating prediction data from the at least one simulation;
   determining a forecast error associated with the generated prediction data;

generating multiple simulation holdout runs by changing one input to the simulation or one change to the simulation per generated simulation holdout run;
comparing the multiple simulation holdout runs to the generated prediction data;
splitting the forecast error into simulation components and input components;
applying a second at least one simulation to the statistical clusters, the second at least one simulation simulating revenue and loss volatility on the statistical clusters; and
generating second prediction data from the second at least one simulation.

2. The one or more non-transitory computer readable media of claim 1, the computer executable instructions that, when executed by the at least one processor, further cause the at least one processor to perform optimizing the portfolio of the entity based on the generated prediction data.

3. The one or more non-transitory computer readable media of claim 1, wherein the applying at least one simulation includes simulating revenue and loss volatility in one of a bull market, a bear market, and a particular cycle.

4. The one or more non-transitory computer readable media of claim 3, the computer executable instructions that, when executed by the at least one processor, further cause the at least one processor to perform optimizing the portfolio of the entity based on the generated prediction data.

5. The one or more non-transitory computer readable media of claim 1, wherein the applying at least one simulation includes applying a plurality of different simulations to the statistical clusters.

6. The one or more non-transitory computer readable media of claim 5, the computer executable instructions that, when executed by the at least one processor, further cause the at least one processor to perform optimizing the portfolio of the entity based on the generated prediction data.

7. An apparatus comprising:
at least one processor; and
at least one memory having stored therein computer executable instructions, that when executed by the at least one processor, cause the apparatus to:
collect account level historical data for a plurality of customers associated with accounts as part of a portfolio of an entity;
segment the account level historical data into a plurality of groups of customers of the plurality of customers with similar revenue and loss characteristics identified within the accounts of the customers;
decompose the segmented data into seasoning, vintage, and cycle effects;
form statistical clusters based upon the collected account level historical data wherein the form statistical clusters is based upon the seasoning, vintage, and cycle effects and the plurality of groups of customers;
apply at least one simulation to the statistical clusters, the at least one simulation simulating revenue and loss volatility on the statistical clusters;
generate prediction data from the at least one simulation;
determine a forecast error associated with the generated prediction data;
generate multiple simulation holdout runs by changing one input to the simulation or one change to the simulation per generated simulation holdout run;
compare the multiple simulation holdout runs to the generated prediction data;
split the forecast error into simulation components and input components;
apply a second at least one simulation to the statistical clusters, the second at least one simulation simulating revenue and loss volatility on the statistical clusters; and
generate second prediction data from the second at least one simulation.

8. The apparatus of claim 7, the computer executable instructions further causing the apparatus to optimize the portfolio of the entity based on the generated prediction data.

9. The apparatus of claim 7, wherein the apply at least one simulation includes apply a plurality of different simulations to the statistical clusters.

10. The apparatus of claim 7, the computer executable instructions further causing the apparatus to optimize the portfolio of the entity based on the generated prediction data.

11. A method comprising:
collecting, at a first computing device, account level historical data for a plurality of customers associated with accounts as part of a portfolio of an entity;
segmenting the account level historical data into a plurality of groups of customers of the plurality of customers with similar revenue and loss characteristics identified within the accounts of the customers;
decomposing the segmented data into seasoning, vintage, and cycle effects;
forming, by the first computing device, statistical clusters based upon the collected account level historical data, wherein the forming statistical clusters is based upon the seasoning, vintage, and cycle effects and the plurality of groups of customers;
applying, by the first computing device, at least one simulation to the statistical clusters, the at least one simulation simulating revenue and loss volatility on the statistical clusters;
generating, by the first computing device, prediction data from the at least one simulation;
determining, by the first computing device, a forecast error associated with the generated prediction data;
generating, by the first computing device, multiple simulation holdout runs by changing one input to the simulation or one change to the simulation per generated simulation holdout run;
comparing, by the first computing device, the multiple simulation holdout runs to the generated prediction data;
splitting, by the first computing device, the forecast error into simulation components and input components;
applying, by the first computing device, a second at least one simulation to the statistical clusters, the second at least one simulation simulating revenue and loss volatility on the statistical clusters; and
generating, by the first computing device, second prediction data from the second at least one simulation.

12. The method of claim 11, further comprising optimizing the portfolio of the entity based on the generated prediction data.

* * * * *